US011164372B2

(12) United States Patent
Kilgard

(10) Patent No.: US 11,164,372 B2
(45) Date of Patent: Nov. 2, 2021

(54) POLAR STROKING FOR VECTOR GRAPHICS

(71) Applicant: Nvidia Corporation, Santa Clara, CA (US)

(72) Inventor: Mark Kilgard, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/714,621

(22) Filed: Dec. 13, 2019

(65) Prior Publication Data

US 2021/0174584 A1  Jun. 10, 2021

Related U.S. Application Data

(60) Provisional application No. 62/946,267, filed on Dec. 10, 2019.

(51) Int. Cl.
*G06T 17/00* (2006.01)
*G06T 17/20* (2006.01)
*G06T 1/20* (2006.01)

(52) U.S. Cl.
CPC ............... *G06T 17/20* (2013.01); *G06T 1/20* (2013.01)

(58) Field of Classification Search
None
See application file for complete search history.

(56) References Cited

U.S. PATENT DOCUMENTS

| 5,734,756 | A | * | 3/1998 | Sherman | ............... | G06T 11/203 |
| | | | | | | 382/259 |
| 5,886,702 | A | * | 3/1999 | Migdal | ............... | G06T 17/20 |
| | | | | | | 345/423 |
| 6,266,062 | B1 | * | 7/2001 | Rivara | ............... | G06T 17/20 |
| | | | | | | 345/419 |
| 7,212,205 | B2 | * | 5/2007 | Uesaki | ............... | G06T 17/30 |
| | | | | | | 345/419 |
| 7,764,286 | B1 | * | 7/2010 | Kumar | ............... | G06T 11/00 |
| | | | | | | 345/426 |
| 7,868,887 | B1 | * | 1/2011 | Yhann | ............... | G06T 11/203 |
| | | | | | | 345/442 |
| 7,872,648 | B2 | * | 1/2011 | Hoppe | ............... | G06T 9/00 |
| | | | | | | 345/423 |
| 7,952,580 | B1 | * | 5/2011 | Yhann | ............... | G06T 11/203 |
| | | | | | | 345/423 |

(Continued)

*Primary Examiner* — Martin Mushambo

(57) ABSTRACT

The disclosure introduces polar stroking for representing paths. A system, method, and apparatus are disclosed for representing and rendering stroked paths employing polar stroking. In one example, a method of approximating a link of a path is provided that includes: (1) determining tangent angle changes of a link of a path, (2) evaluating the link in steps based on the tangent angle changes, and (3) providing a polar stroked representation of the link employing the steps, wherein the evaluating is performed non-recursively. A polar stroking system is also disclosed. In one example, the polar stroking system includes: (1) a path processor configured to decompose a path into links, and (2) a polar stroking processor configured to determine polar stroking intermediates of the links from a characterization of the links and generate, employing the polar stroking intermediates, a polar stroked representation for each of the links.

33 Claims, 16 Drawing Sheets

(56) References Cited

U.S. PATENT DOCUMENTS

| | | | | |
|---|---|---|---|---|
| 8,584,012 B1* | 11/2013 | Orshanskiy | G06T 11/203 | 715/264 |
| 8,665,276 B2* | 3/2014 | Chiang | G06T 11/203 | 345/442 |
| 10,212,457 B1* | 2/2019 | Livshitz | G06T 5/007 | |
| 10,380,769 B1* | 8/2019 | Beri | G06T 11/203 | |
| 2002/0094926 A1* | 7/2002 | Kling | G06T 17/20 | 493/356 |
| 2004/0001061 A1* | 1/2004 | Stollnitz | G06T 17/30 | 345/423 |
| 2004/0090437 A1* | 5/2004 | Uesaki | G06T 17/30 | 345/420 |
| 2006/0125824 A1* | 6/2006 | Sfarti | G06T 17/205 | 345/423 |
| 2006/0158450 A1* | 7/2006 | Ferguson | G06T 13/00 | 345/423 |
| 2007/0115289 A1* | 5/2007 | Goldfarb | G06T 13/40 | 345/473 |
| 2008/0198168 A1* | 8/2008 | Jiao | G06T 11/40 | 345/506 |
| 2009/0027397 A1* | 1/2009 | Frisken | G06K 9/00416 | 345/442 |
| 2009/0027398 A1* | 1/2009 | Frisken | G06T 11/203 | 345/442 |
| 2010/0216575 A1* | 8/2010 | Sato | A63B 37/0021 | 473/383 |
| 2010/0283780 A1* | 11/2010 | Ohmori | G06T 15/20 | 345/419 |
| 2010/0289802 A1* | 11/2010 | Falchetto | G06T 11/203 | 345/442 |
| 2011/0090228 A1* | 4/2011 | Persson | G06T 11/203 | 345/443 |
| 2011/0164041 A1* | 7/2011 | Miura | G06T 11/203 | 345/442 |
| 2011/0251829 A1* | 10/2011 | Baxter, III | G06T 11/001 | 703/1 |
| 2011/0285721 A1* | 11/2011 | Kilgard | G06T 15/005 | 345/442 |
| 2011/0285724 A1* | 11/2011 | Kilgard | G06T 11/203 | 345/443 |
| 2011/0285736 A1* | 11/2011 | Kilgard | G06T 11/203 | 345/584 |
| 2011/0285747 A1* | 11/2011 | Kilgard | G06T 11/203 | 345/613 |
| 2012/0268794 A1* | 10/2012 | Lard | G06T 11/203 | 358/1.18 |
| 2013/0120383 A1* | 5/2013 | Joshi | G06T 17/00 | 345/423 |
| 2013/0120391 A1* | 5/2013 | Brown | G06T 11/203 | 345/441 |
| 2013/0127869 A1* | 5/2013 | Winnemoeller | G06T 11/203 | 345/441 |
| 2013/0293554 A1* | 11/2013 | Vostrikov | G06T 11/203 | 345/442 |
| 2014/0043330 A1* | 2/2014 | Ceylan | G06T 17/20 | 345/423 |
| 2014/0043341 A1* | 2/2014 | Goel | G06T 1/00 | 345/501 |
| 2014/0043342 A1* | 2/2014 | Goel | G06T 11/203 | 345/501 |
| 2015/0015579 A1* | 1/2015 | Brown | G06F 11/36 | 345/423 |
| 2015/0023595 A1* | 1/2015 | Perry | G06T 11/203 | 382/173 |
| 2015/0062142 A1* | 3/2015 | Goel | G06T 15/005 | 345/582 |
| 2015/0062600 A1* | 3/2015 | Takeichi | G06T 11/203 | 358/1.9 |
| 2015/0063706 A1* | 3/2015 | Lampinen | G06T 11/203 | 382/197 |
| 2015/0077420 A1* | 3/2015 | Bolz | G06T 11/203 | 345/442 |
| 2015/0178961 A1* | 6/2015 | Karras | G06T 11/203 | 345/442 |
| 2015/0178974 A1* | 6/2015 | Goel | G06T 11/203 | 345/420 |
| 2016/0343161 A1* | 11/2016 | Paladini | G06T 1/60 | |
| 2017/0039765 A1* | 2/2017 | Zhou | G06T 7/55 | |
| 2017/0200292 A1* | 7/2017 | Betts | G06T 11/203 | |
| 2017/0270710 A1* | 9/2017 | Ben | G06T 11/40 | |
| 2017/0278283 A1* | 9/2017 | Bloomfield | G06T 11/203 | |
| 2018/0089890 A1* | 3/2018 | Shreiner | G06T 17/20 | |
| 2018/0232912 A1* | 8/2018 | Nevraev | G06T 1/60 | |
| 2019/0088014 A1* | 3/2019 | Richards | G06T 19/00 | |
| 2019/0236820 A1* | 8/2019 | Lengyel | G06T 11/203 | |
| 2019/0236827 A1* | 8/2019 | Hakura | G06T 15/04 | |
| 2019/0236829 A1* | 8/2019 | Hakura | G06T 15/005 | |
| 2019/0371008 A1* | 12/2019 | Peterson | G06T 9/20 | |
| 2019/0371009 A1* | 12/2019 | Peterson | G06T 11/60 | |

\* cited by examiner

POLAR STROKING FOR VECTOR GRAPHICS

CROSS-REFERENCE TO RELATED APPLICATION

This application claims the benefit of U.S. Provisional Application Ser. No. 62/946,267, filed by Mark Kilgard on Dec. 10, 2019, entitled "POLAR STROKING FOR VECTOR GRAPHICS," commonly assigned with this application and incorporated herein by reference in its entirety.

TECHNICAL FIELD

This application is directed, in general, to representing paths and, more specifically, to representing and rendering stroked paths for vector graphics.

BACKGROUND

Vector graphics (as used in PostScript, PDF, Scalable Vector Graphics, OpenVG, Flash, etc.) renders shapes and text in one of two ways: filling (essentially "coloring inside a shape") or stroking (essentially "outlining a shape"). These shapes are commonly called "paths" and the process of rendering filled or stroked paths is often called "path rendering".

Existing methods perform stroking by slow CPU rasterization techniques or faster GPU methods that involve significant CPU pre-processing. The need for CPU-based pre-processing often leaves GPU stroking methods bottlenecked by CPU operations. Furthermore, the CPU-based pre-processing for GPU stroking methods typically combines rendering state such as stroke width, cap style, and join style into the path's GPU representation that then becomes expensive to change. Such GPU representations also take substantially more memory to store than the path's original representation.

SUMMARY

In one aspect, the disclosure provides a method of approximating a link of a path. In one example, the method includes: (1) determining tangent angle changes of a link of a path, (2) evaluating the link in steps based on the tangent angle changes, and (3) providing a polar stroked representation of the link employing the steps, wherein the evaluating is performed non-recursively.

In another aspect, the disclosure provides a polar stroking system. In one example, the polar stroking system includes: (1) a path processor configured to decompose a path into links, and (2) a polar stroking processor configured to determine polar stroking intermediates of the links from a characterization of the links and generate, employing the polar stroking intermediates, a polar stroked representation for each of the links.

In yet another aspect, the disclosure provides a renderer. In one example, the renderer includes: (1) CPU configured to decompose a path into links, and (2) a GPU configured to generate a stroked tessellation of the path based on a polar stroked representation of each of the links.

In still another aspect, the disclosure provides a method of rendering stroked paths. In one example, the method includes: (1) obtaining a characterization of at least one link of a path, (2) computing polar stroking intermediate values of the at least one link from the characterization, (3) generating, employing the polar stroking intermediates, a sequence of quadrilaterals to represent the at least one link, and (4) providing a stroked tessellation of the path employing the sequence of quadrilaterals for the at least one link.

BRIEF DESCRIPTION

Reference is now made to the following descriptions taken in conjunction with the accompanying drawings, in which.

Figure 1:
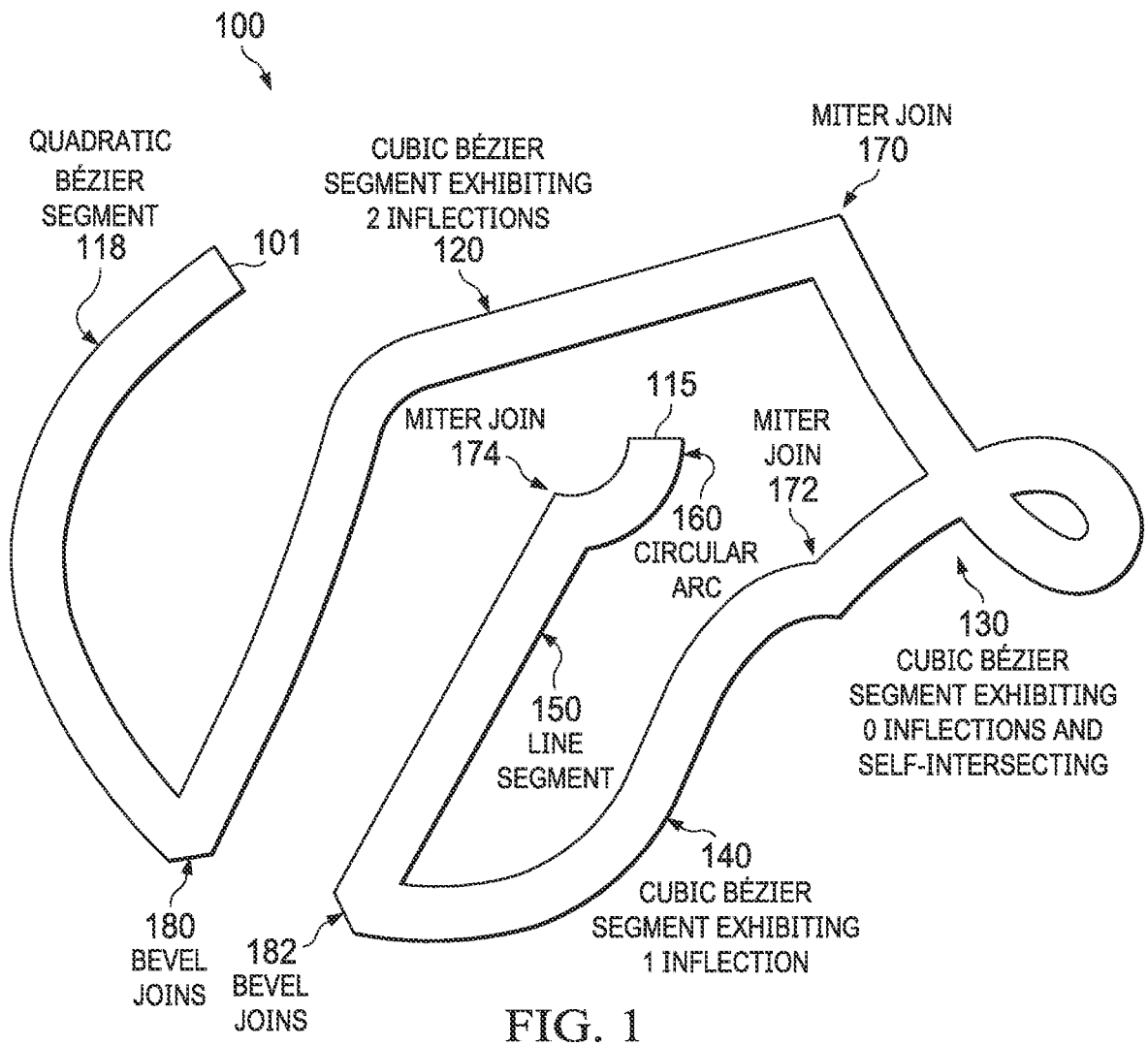
FIG. 1 illustrates a diagram of an example of a path that is represented by polar stroking according to the principles of the disclosure.
Figure 5:
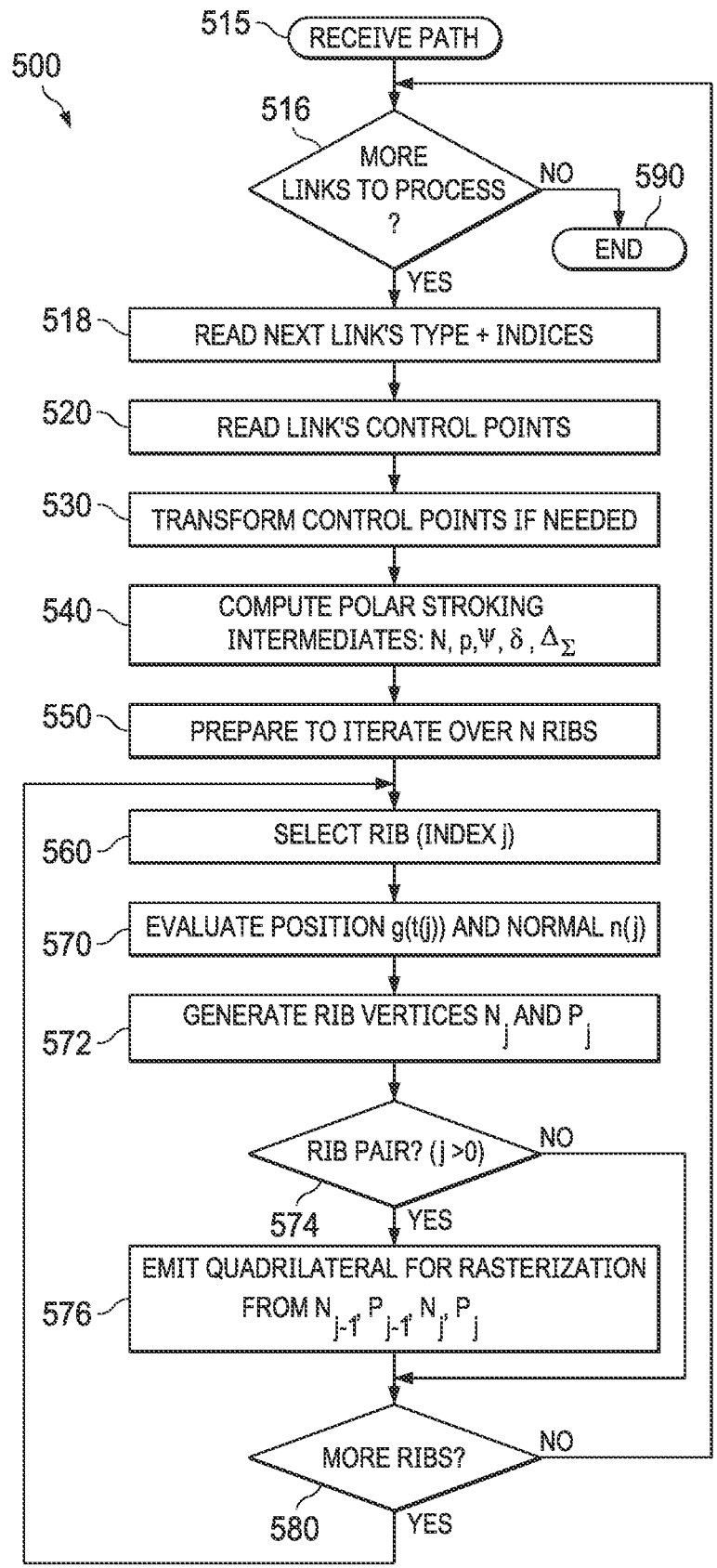
FIG. 5 illustrates a flow diagram of an example of a method of polar stroking carried out according to the principles of the disclosure.
Figure 6:
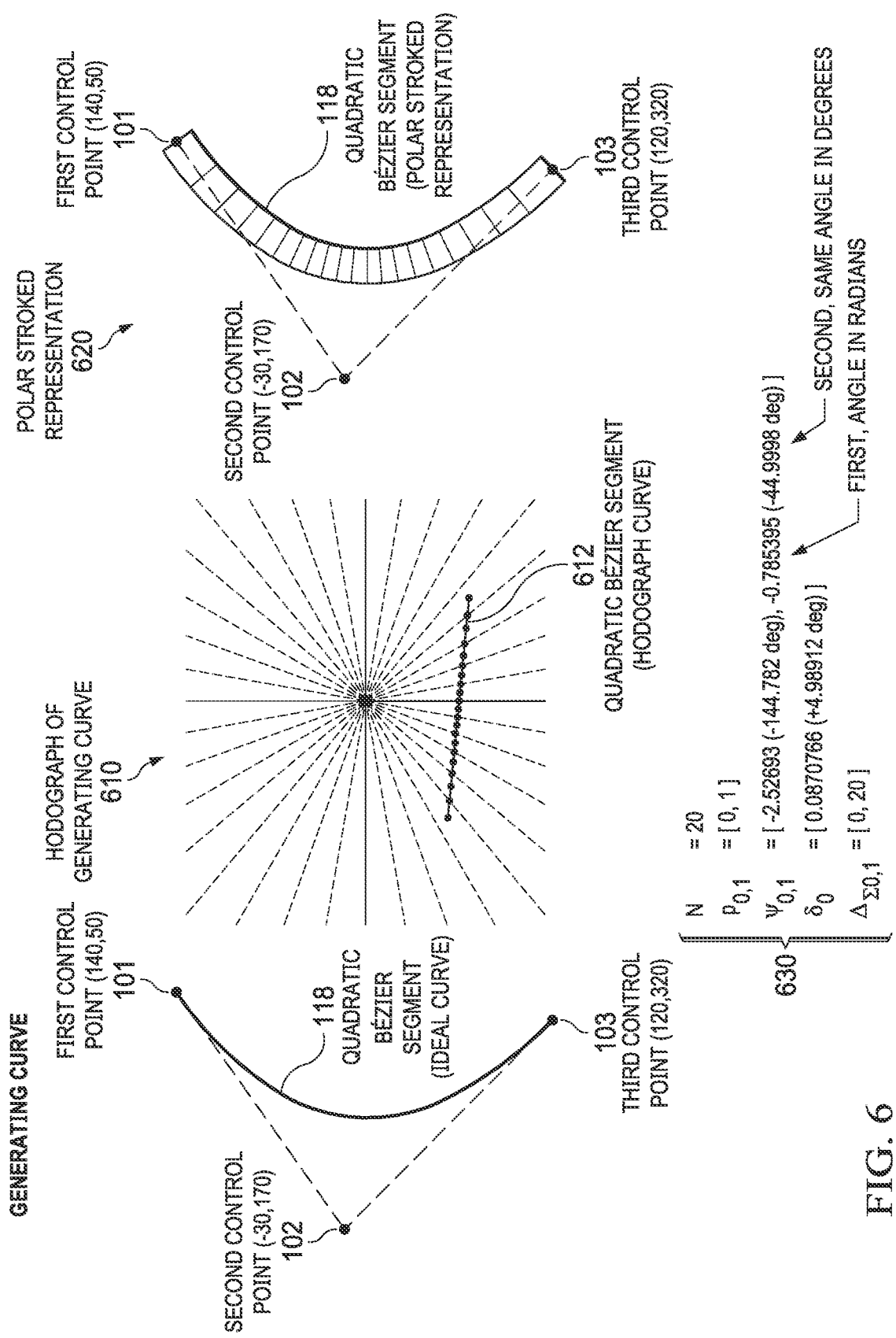
FIG. 6 illustrates a link of the path of FIG. 1 along with a hodograph that includes a hodograph curve of the link, and a polar stroked representation of the link provided by the polar stroking method 500 of FIG. 5.
Figure 16:
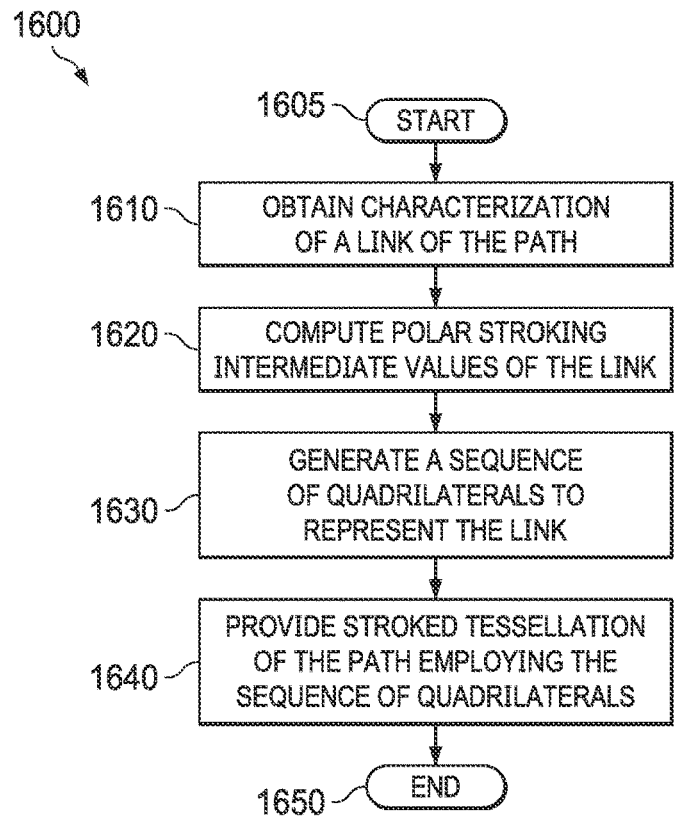
Figure 17:
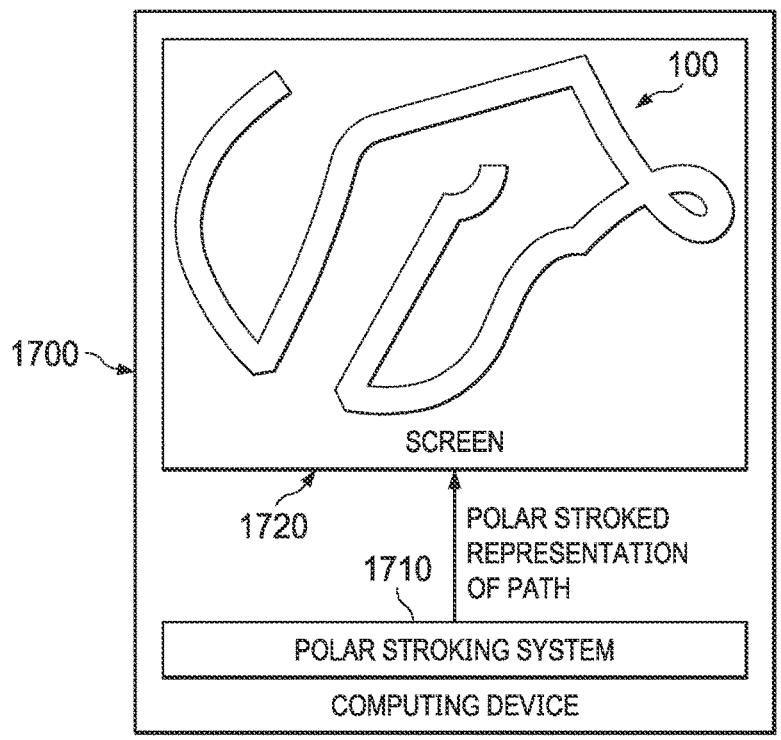
Figure 18:
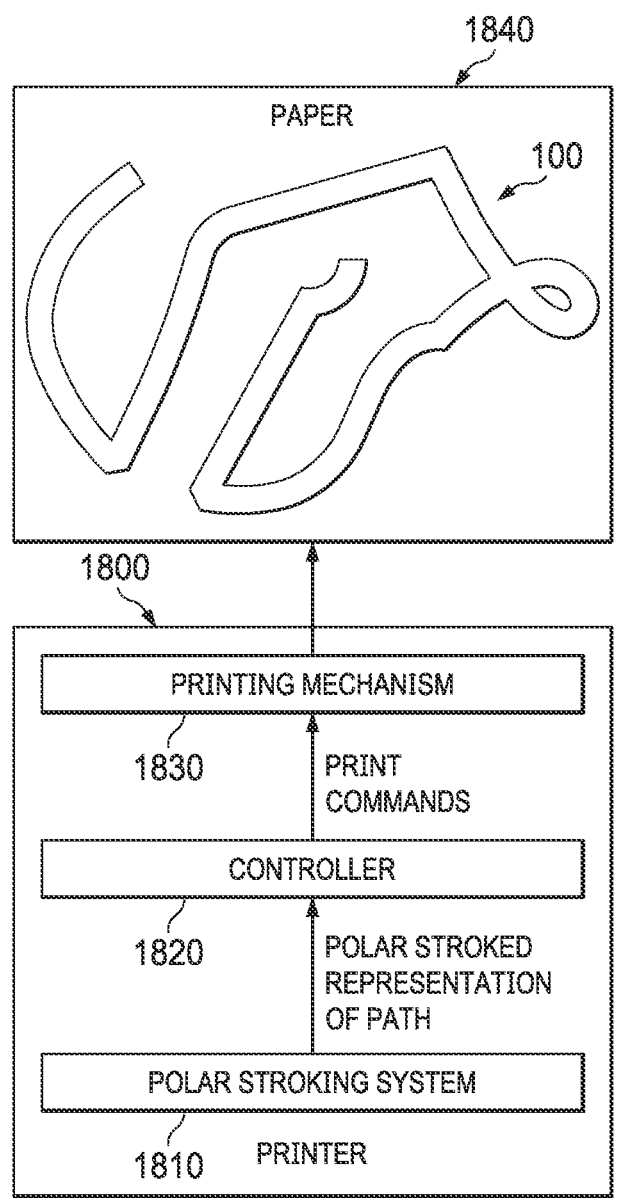

FIGS. 7 to 10 visually represent steps of the method 500 for providing the polar stroked representation illustrated in FIG. 6;

FIGS. 11 to 15 illustrate other links of the path of FIG. 1 along with a corresponding hodograph that includes a hodograph curve of the different links, and a polar stroked representation of the links provided by the polar stroking method 500 of FIG. 5;

FIG. 16 illustrates a flow diagram of an example of a method of rendering stroked paths carried out according to the principles of the disclosure FIG. 17 illustrates a block diagram of an example of a computing device configured to display a path employing polar stroking according to the principles of the disclosure; and FIG. 18 illustrates a block diagram of an example of a printer configured to print a path employing polar stroking according to the principles of the disclosure.

DETAILED DESCRIPTION

The disclosure provides an improved stroking operation for representing paths, such as improving the stroking operation in path rendering. The improved stroking operation, referred to herein as polar stroking, employs stepping in tangent angles along a path to provide a polar stroked representation on the path. A path is a combination of path components that are referred to herein as links. A link of a path may be a segment, such as a straight or curved segment, a cap, or a join. Stepping in tangent angles along a link or links of a path involves "solving" to determine when a link might change from turning clockwise to counter-clockwise (or vice versa) and then at every step, solving for when a gradient of the link is orthogonal to a 90 degree rotation of each tangent angle step. This approach can employ trigonometric functions and solving a line-curve intersection at every step along a link.

Advantageously, the disclosure recognizes the line-curve intersection is where the hodograph curve of a link's generating equation coincides with a polar line. A hodograph is a polar graph that includes a hodograph curve of a link's gradient. For example, the hodograph curve of a link that is a cubic Bézier curve is a parabola. A polar line is a line through a hodograph's origin at a specified angle. Solving for the intersection between the hodograph curve and a polar line using the polar line's implicit equation and a parametric equation for the hodograph curve provides a parametric value at which the link is heading into the angular direction of the polar line. As there may be more than one such intersection, the intersection determination is bounded to a single solution within a parametric range of interest. FIGS. 6 and 11 to 15 illustrate examples of links and their corresponding hodograph curves.

The polar stroked representations can be used to generate stroked tessellations of paths. For example, the polar stroked representation of a link can be a sequence of polygons, such as quadrilaterals, that represent the link, and can be used to generate a stroked tessellation. For existing methods that employ a CPU for generating a stroked tessellation, stepping in tangent angles would be an expensive approach. The efficient trigonometric function evaluation (sin, cos, atan 2) of parallel processors, such as a GPU, makes the solving steps of stepping in tangent angles entirely viable. For example, since the polar stroking method determines how many steps to take without a recursive process, the polar stroking method maps well to GPU tessellation and mesh shaders. The entire polar stroking method (e.g., tessellation, rasterization, and shading) can be performed by a GPU.

The disclosed polar stroking can be employed to improve the performance and quality of stroked path rendering in several different areas including web browsers (Scalable Vector Graphics (SVG)), document viewers (PDF), navigation and mapping systems, and illustration applications (Adobe Illustrator, Inkscape). Polar stroking can also be used to control different machines that perform an operation according to an input path. For example, a Computer Numerical Control (CNC) machine that processes a material according to an input path. Polar stroking is also beneficial where the stroke expansion happens in a different coordinate space from the path itself. A typical use for this is window-space stroking (known as non-scaling-stroke in SVG). This is important for applications such as the maps and navigation systems where the stroking is specified with a width in pixels (typically 1) so that when zooming into the map the width of grid lines or markings do not zoom too.

Advantageously, the polar stroking method can also process each link of a path without making special arrangements for different types of links. For example, curved paths can contain cusps, which is a point on the curve where the curvature becomes infinite. Recursive methods cannot bound the curvature when it is infinite. As such, existing recursive stroking methods handle cusps specially. The practical problem with a cusp is the gradient becomes (0,0), a zero-length vector which cannot be normalized. Since the polar stroking technique operates by stepping in tangent angles in a gradient-free manner, the polar stroking method automatically handles cusps without any special handling.

Turning now to the figures, FIG. 1 illustrates a diagram of an example of a path 100 that is composed of links. The path 100 represents a complete path having a start point 101, an end point 115, and multiple links of segments and joins between the start point 101 and the end point 115. Start point 101 and end point 115 are also referred to herein as control point 101 and control point 115, respectively. The path 100 includes a variety of path segment types including a line segment (simplest), a Quadratic Bézier segment, a Circular arc that is more generally a rational quadratic Bézier segment, and Cubic Bézier segments that include a variety of topologies (loop, serpentine) and demonstrate 0 to 2 inflection points. The segments exemplify key topologies of quadratic, cubic, line, and arc segments that have a 1-to-1 correspondence with conventional SVG path commands. Each of the segments and joins is defined by a generating equation that includes a set of control points, wherein the first and last control points coincide with the end points of the segment or joins. The path 100 is a simple path that is used to illustrate the polar stroking techniques of the disclosure. Since polar stroking includes stepping in gradient space angle, the polar stroking technique generalizes broadly to more complicated paths having multiple types of links of various standard path segment types and joins.

The path 100 includes a quadratic Bézier segment 118, a cubic Bézier segment with two inflections 120, a cubic Bézier segment with zero inflections 130, a cubic Bézier segment with one inflection 140, a line segment 150, and a circular arc 160. The path 100 also includes joins that connect the segments together. The example joins are miter joins 170, 172, 174, and bevel joins 180, 182. Miter join 170 connects Bézier segment 120 to Bézier segment 130, miter join 172 connects Bézier segment 130 to Bézier segment 140, and miter join 174 connects Bézier segment 150 to circular arc 160. Bevel join 180 connects Bézier segment 118 to Bézier segment 120, and bevel join 182 connects Bézier segment 140 to line segment 150. FIGS. 6 and 11 to 15 illustrate each of the segments of the path 100, the corresponding hodograph, and an example of a polar stroked representation generated according to polar stroking. The path 100 can be provided to a system, such as the polar stroking system 200 of FIG. 2, for generating a polar stroked representation.

Figure 2:
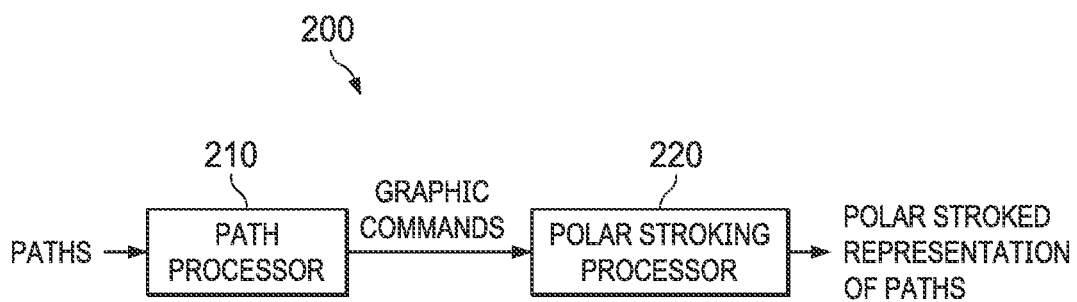
FIG. 2 illustrates a block diagram of an example of a polar stroking system constructed to perform polar stroking according to the principles of the disclosure.

FIG. 2 illustrates a block diagram of an example of a polar stroking system 200 constructed to represent paths employing polar stroking according to the principles of the disclosure. The polar stroking system 200 can be, or be part of, a renderer that draws stroked tessellations of the paths. The polar stroking system 200 can be located on a single computing device or distributed over multiple computing devices. The computing devices can be, for example, a laptop, a desktop, a computing pad, a smart phone, or a server. The computing devices can include at least one screen for displaying the paths. The computing devices can also be a machine or used to control a machine. For example, the polar stroking system 200 can be associated with or integrated with a machine, such as a printer that prints the paths or a CNC machine that processes a material using the paths. In some examples, the polar stroking system 200 is a cloud-based server. The polar stroking system 200 includes a path processor 210 and a polar stroking processor 220. The polar stroking system 200 can include more than one path processor 210 or more than one polar stroking processor 220. The path processor 210 or the polar stroking processor 220 can be a central processing unit (CPU) or a graphics processing unit (GPU). In one example, the path processor 210 is a CPU and the polar stroking processor 220 is a GPU. Advantageously, a GPU can include multiple parallel processors to allow processing of multiple links in parallel. In some examples, the path processor 210 and the polar stroking processor 220 can be a single processor.

The polar stroking system 200 is configured to receive paths to be represented and generate a polar stroked representation of the paths. The received paths can be in the form of code representing the generating equations for the links of the path, such as SVG path commands. The generating equation for each link includes the control points for that link. The paths can be from, for example, a web browser, a document viewer, a navigation or mapping system, or an illustration application, such as a vector graphics program. A received path can be simple, such as path 100 of FIG. 1, or complex with multiple types of segments and joins sequenced together in multiple combinations.

The path processor 210 is configured to decompose received paths into links, such as the segments and joins of path 100, and encode the links for storage. For example, the path processor 210 can receive path 100 and decompose path 100 to the various segments and joins illustrated in FIG. 1 and encode the segments and joins for storage. The encoded links can be stored in a memory of the polar stroking processor 220. As such, the path processor 210 encodes the links into a format that can be stored and read by the polar stroking processor 220. The encoded links and control points of the links are downloaded to the polar stroking processor 220 for representing the path 100. The path processor 210 can be configured to perform additional processing of the links to enable polar stroking before instructing the polar stroking processor 220 to generate the polar stroked representations of the links. The additional processing can correspond to the processing performed by CPU 310 of FIG. 3.

At this point, the path processor 210 sends commands to the polar stroking processor 220 instructing the polar stroking processor 220 to generate the polar stroked representations of the path links. The commands can be sent from the path processor 210 to the polar stroking processor 220 through a programing interface, wherein the commands appear as function calls. The links can be generated as primitives, such as patches, or can be generated as tasks. The generated polar stroked representations can be used to represent the path visually. For example, the polar stroking processor 220 can provide the polar stroked representations to computing device screens to display the path. The computing devices can be, for example, a laptop, a desktop, a computing pad, a smart phone, or another type of computing device having a screen capable of displaying the polar stroked representations. The polar stroking processor 220 can also provide the polar stroked representations for printing of the path or operating a machine employing the path. For example, the polar stroking system 200 can be integrated with a printer that employs the polar stroked representations to print the path. FIG. 17 illustrates an example of a display showing a path using the polar stroked representations. FIG. 18 illustrates an example of a printer using the polar stroked representations to print the path. The path 100 of FIG. 1 is used as an example path for both FIGS. 17 and 18.

The polar stroking processor 220 can be configured to generate the polar stroked representations by determining polar stroking intermediates of the link from a characterization of the link and employing the polar stroking intermediates to generate the polar stroked representations. A characterization of a link is a collection of features that define the link. For example, the characterization of a link can include a combination of features, such as the type of the link, the generating equation of the link, the control points of the link, and indices to those the control points. The polar stroking processor 220 can operate according to the polar stroking algorithms disclosed herein. Accordingly, the polar stroking processor 220 can effectively encode the algorithms that are disclosed herein, such as the algorithm represented by the flow chart of FIG. 5.

The polar stroking processor 220 can generate the polar stroked representations for links of the polar stroking processor 220 in parallel. In some examples, the polar stroking processor 220 can generate the polar stroked representations for multiple paths in parallel. Thus, the polar stroking processor 220 can operate on multiple paths in parallel while also operating on the multiple links of those paths in parallel. In parallel as used herein includes at least partially in parallel and indicates that processing is occurring in parallel paths but not necessarily simultaneously.

The polar stroking processor 220 can be a GPU and operate according to a graphics pipeline where certain steps of polar stroking occur at particular stages along the graphics pipeline. The polar stroking processor 220 can provide polar stroking functionality via a shader or shaders of the graphics pipeline. Shaders are programs that perform a particular function or functions at the particular stages of the graphics pipeline. Polar stroking shaders are examples of shaders that have been programmed to perform the polar stroking functions disclosed herein. Polar stroking shaders can perform additional functions that are typically included in a graphics pipeline or can execute as part of a shader (or shaders) of a graphics pipeline. The polar stroking processor 220 can employ one of the different examples of a graphics pipeline such as illustrated in FIG. 3 or FIG. 4.

Figure 3:
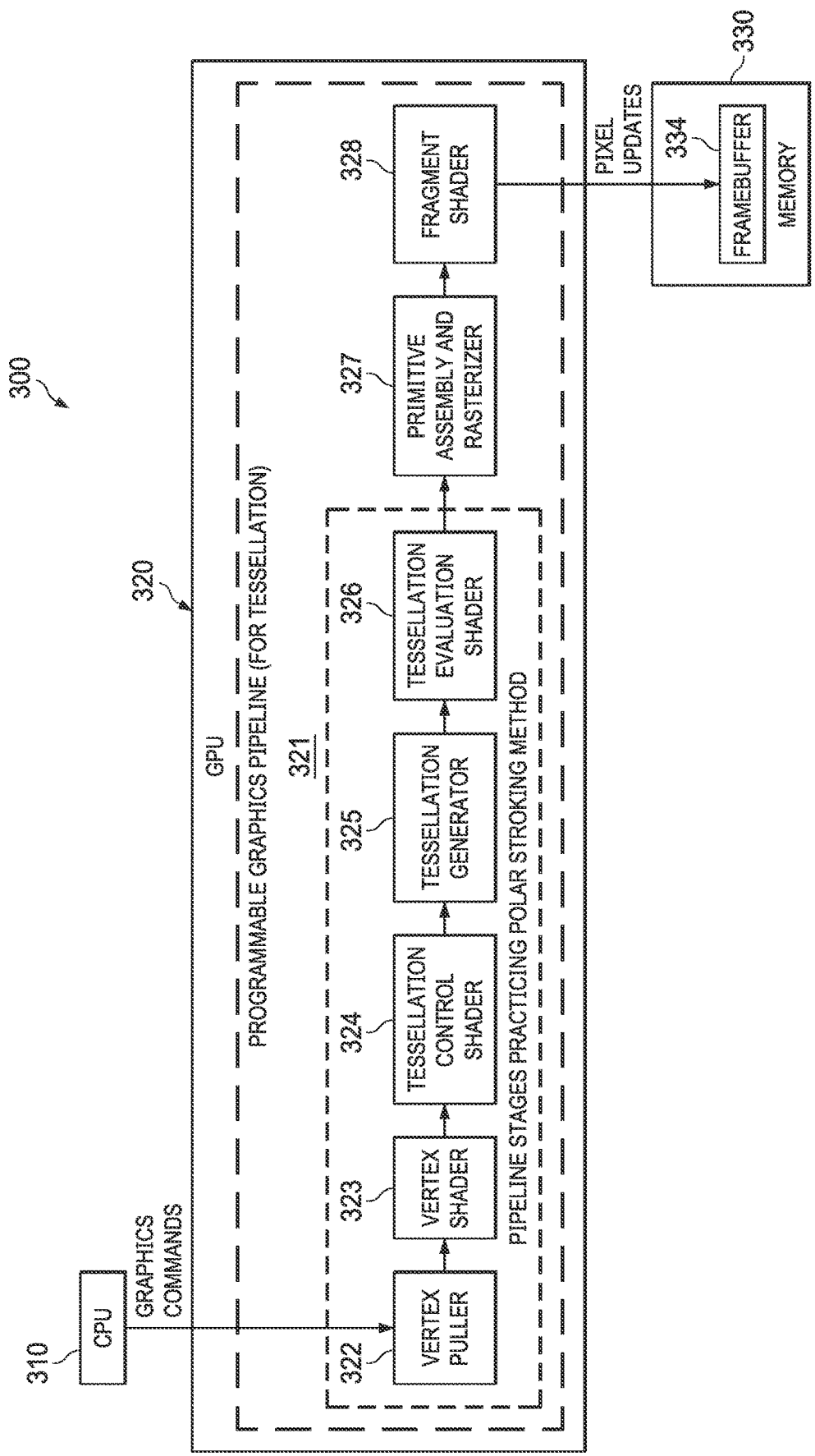
FIG. 3 illustrates a block diagram of an example of a renderer constructed to perform polar stroking according to the principles of the disclosure.
Figure 4:
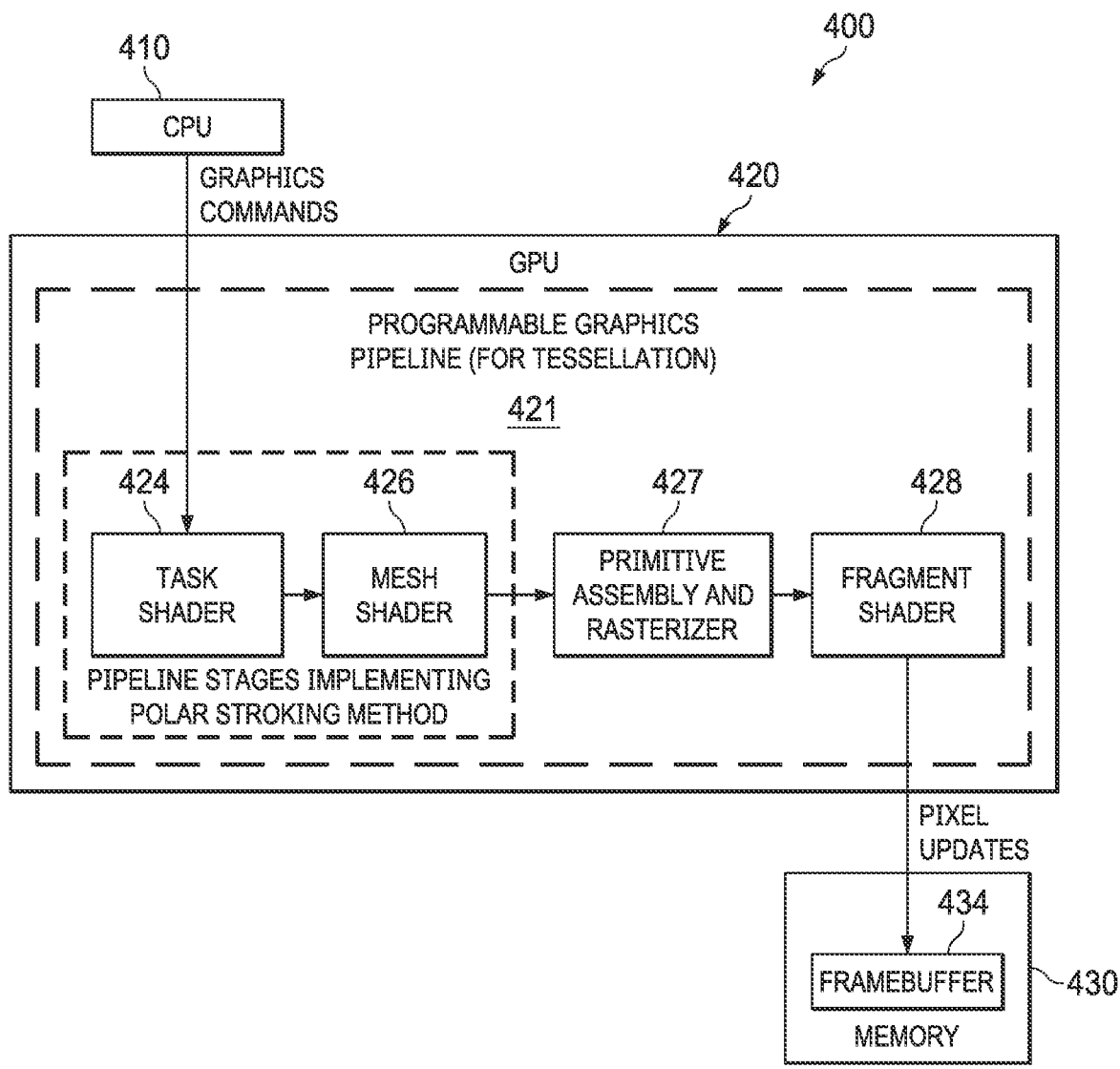
FIG. 4 illustrates a block diagram of another example of a renderer constructed to perform polar stroking according to the principles of the disclosure.

FIG. 3 illustrates a block diagram of an example of a renderer 300 including a graphics pipeline constructed to perform polar stroking according to the principles of the disclosure. The renderer 300 provides an example of a system for polar stroking, such as the polar stroking system 200 of FIG. 2. The renderer 300 renders a path employing polar stroking. The renderer 300 includes a CPU 310, a GPU 320, and another hardware component, a memory 330.

The CPU 310 is configured to accept or receive a path, decompose the path to links, encode the links, and download the links and control points to the GPU 320 via graphic commands. The CPU 310 is further configured to bind polar stroking shaders of the GPU 320. The binding can include establishing a current configuration for polar stroking shaders and setting variables. The CPU 310 also sets uniforms for the polar stroking shaders. A uniform's value does not change during the shader processing; uniforms are constants for duration of the polar stroking process. For example, a stroke width can be set to five. Another part of configuring can include transforming the path's coordinate space by rotation, translation, scaling, or projection. At this point, the CPU 310 sends commands to the GPU 320 instructing the GPU 320 to draw the links of the path. The commands can be sent from the CPU 310 to the GPU 320 through a programing interface, wherein the commands appear as function calls. As noted above, the links can be drawn as patches or tasks. Other primitives, such as a triangle, can also be employed by a graphics pipeline for rendering.

The GPU 320 includes a programmable graphics pipeline 321 for processing primitives that represent the path. The primitive can be a patch and will be used as an example primitive for discussing the operation of the graphics pipeline 321. The graphics pipeline 321 includes a vertex puller 322, a vertex shader 323, a tessellation control shader 324, a tessellation generator 325, a tessellation evaluation shader 326, a primitive assembly and rasterizer 327, and a fragment shader 328. Some of the stages, such as the vertex puller 322, the tessellation generator 325, and the primitive assembly and rasterizer 327 are fixed-function GPU stages of the graphics pipeline 321. The other illustrated stages, the vertex shader 323, the tessellation control shader 324, the tessellation evaluation shader 326, and the fragment shader 328, are programmable shader GPU stages of the graphics pipeline 321. A GPU capable of OpenGL 4.0, OpenGL for embedded systems (ES) 3.2, Direct3D 11, or a similar graphics application programming interface provides such a programmable graphics pipeline 321 with these stages. OpenGL 4.0 and OpenGL ES 3.2 are available from The Khronos Group, Inc., based in Beaverton, Oreg., and Direct3D 11 is available from Microsoft Corporation of Redmond, Wash. A GPU available from Nvidia Corporation of Santa Clara, Calif., that has a Volta or Pascal architecture is an example of a GPU that can provide the programmable graphics pipeline 321. As noted below with respect to FIG. 5, various stages of the graphics pipeline 321 can also be configured to perform steps of the polar stroking method 500.

The vertex puller 322 is the first stage of the graphics pipeline 321 that fetches vertices of the patches. The vertex shader 323 then describes the various traits of each of the vertices. The tessellation control shader 324, the tessellation generator 325, and the tessellation evaluation shader 326 cooperate to tessellate patches into a triangle mesh or connected lines. The tessellation control shader 324 and the tessellation evaluation shader 326 are two programmable stages for GPU tessellation and the tessellation generator 325 is a fixed-function GPU stage. The tessellation control shader 324 performs patch-wide computations as the first stage of GPU tessellation, such as computing a level of detail (LOD) per patch. The tessellation generator 325 uses tessellation levels to decompose a patch into a new set of primitives and assigns coordinates for each vertex. The tessellation evaluation shader 326 evaluates mesh vertices based on information provided by the tessellation control shader 324 and the tessellation generator 325. The tessellation evaluation shader 326 computes the position of each vertex from the tessellation generator 325, controls the tessellation pattern, and specifies orientation of generated patches.

In an example representation of a link intended for pipeline 321, a patch with six control points encodes each link. Six control points is enough to index the four control points of a cubic Bézier segment and two additional to index initial and terminal gradient control points. The other types of links require fewer control points. A special control point index value (for example, zero) can be used to encode the specific kind of link. A skilled practitioner will recognize such a link representation is well-suited to the vertex puller 322 and can be compactly stored in memory.

The primitive assembly and rasterizer 327 divides the resulting tessellated patch generated by tessellation evaluation shader 326 into a sequence of individual rasterization primitives (typically triangles) for rendering. The fragment shader 328 then computes color and other attributes of each pixel of the base patches. The memory 330 receives the pixel updates from the fragment shader 328 of the programmable graphics pipeline 321. The memory 330 includes a framebuffer 334 that stores the received pixel updates, which provides an image for display. In this example, the image is the stroked tessellation for the path. In some examples the memory 330 is a video memory wherein a series of stroked tessellations are encoded into a video stream.

Crucial details to coax a tessellation appropriate for path stroking from the programmable graphics pipeline 321 are not obvious. The tessellation generator 325 typically generates a dense rectangular 2D mesh with the width and height of the mesh limited to 64 on a side. The tessellation of a stroked path segment, cap, or join often needs to be tessellated into a long strip of quadrilaterals (sometimes 100s long) rather than a dense mesh. To tessellate accurately a link needing considerable tessellation, the tessellated strip may need to be many times longer than either the maximum width or height (typically 64 for either) of the dense mesh that tessellation generator 325 can generate. A non-obvious technique, herein called NaN poisoning (as Not-A-Number, or NaN, is an invalid floating-point value), carves the dense mesh into the appropriate (possibly very long) strip for stroking an arbitrary link. In an example usage for the programmable graphics pipeline 321, the polar stroking shader executing on the tessellation evaluation shader 326 generates NaN values for the position of vertices of triangles intended to be discarded. The primitive assembly and rasterizer 327 cannot process rasterize primitives with one or more NaN position values and so must discard any such "NaN-poisoned" primitives. The remaining triangles not discarded have their (NaN-free) vertex positions computed by tessellation evaluation shader 326 so the triangles seam together into a long strip when processed by primitive assembly and rasterizer 327 to form a continuous strip of triangles corresponding to the intended stroked tessellation. Orchestrating the NaN-poisoning and strip seaming involves the polar stroking shader operating on tessellation control shader 324 to feed the appropriate mesh and associated parameters to tessellation generator 325 and tessellation evaluation shader 326.

FIG. 4 illustrates a block diagram of another example of a renderer 400 including a graphics pipeline constructed to perform polar stroking according to the principles of the disclosure. The renderer 400 provides another example of a system for polar stroking, such as the polar stroking system 200 of FIG. 2. The renderer 400 includes a CPU 410, a GPU 420, and a memory 430. The GPU 420 includes a graphics pipeline 421 that similarly provides a stroked tessellation of a link as does the graphics pipeline 321 of the GPU 320 in FIG. 3. The GPU tessellation of the graphics pipeline 421, however, is provided by two programmable stages, a task shader 424 and a mesh shader 426, instead of the tessellation control shader 324, the tessellation generator 325, and the tessellation evaluation shader 326, of the graphics pipeline 321. The other components of the graphics pipeline 421 and the renderer 400 can be configured as and operate as the same named components of the graphics pipeline 321 and the renderer 300 of FIG. 3. As such, the fragment shader 428 is another programmable shader GPU stage and the primitive assembly and rasterizer 427 is a fixed-function GPU stage. A GPU available from Nvidia Corporation that has a Turing architecture is an example of a GPU that can be employed for the programmable graphics pipeline 421. The path processor 210 of FIG. 2 can operate as the CPU 310 of FIG. 3 and the CPU 410 of FIG. 4. While the graphics pipeline 321 operates on a patch representing each link, the graphics pipeline 421 operates on tasks that may represent one or more links and furthermore spawn mesh shader instances to generate the necessary tessellation.

The task shader 424 is programmed to perform the functions of the vertex shader 323 and the tessellation control shader 324 of FIG. 3. As such, the task shader 424 determines the various traits of each of the vertices of its one or more links and reads the vertex data itself, unlike FIG. 2 where the vertices are pulled by a fixed-function vertex puller 322. Then task shader 424 performs patch-wide computations as the first stage of GPU tessellation, similar to tessellation control shader 324.

The mesh shader 426 is configured to perform the remaining GPU tessellation functions that include decomposing one or more links via polar stroking into a new set of primitives, assigning coordinates for each vertex, and evaluating mesh vertices. The mesh shader 426 is further configured to compute the position of each vertex and control the tessellation pattern of an output mesh. The primitive assembly and rasterizer 427 then divides the resulting meshes into a sequence of individual triangles for rendering and the fragment shader 428 computes color and other attributes of each pixel of the base links. Pixel updates are then provided to framebuffer 434 of memory 430 to be used to display the stroked tessellation of the path. As noted below with respect to FIG. 5, the task shader 424 and the mesh shader 426 can also be configured to perform steps of the polar stroking method 500.

FIG. 5 illustrates a flow diagram of an example of a polar stroking method 500 for generating a polar stroked representation. The polar stroked representation can be used for stroked tessellation. As such, some of the steps of method 500 can map to a GPU such as GPU 320 or GPU 420. As denoted below, different stages of the programmable graphics pipelines 321 and 421 can be configured to perform at least some of the steps or particular functions of the polar stroking method 500. At least some of the steps of method 500 can also be performed by the polar stroking system 200 of FIG. 2.

The method 500 includes essentially two steps: determining polar stroking intermediates for each link of the path and employing the polar stroking intermediates to evaluate polygons that are used to generate a polar stroked representation of each link. For the method 500, quadrilaterals will be used as an example polygon. The method 500 begins in a step 515 with a path that is received. The path can be a pre-processed path, such as a path received from the path processor 210 of FIG. 2.

The method 500 proceeds to a step 516 where a determination is made if there is a link of the path to process. The number of links and the type of links will vary depending on the path. For the initial run of the method 500, there will be at least one link of the path to process. When there are no additional links of the path to process, the method 500 continues to step 590 and ends.

When there is a link (i.e., an initial link or a next link) of the path to process, the method 500 continues to step 518 where the type and indices of the link are read. The type of link can be a segment or join, such as represented by the links of the path 100. For example, the link can be a type of Bézier segment or a join, such as a miter join or a bevel join. The indices of the link indicate the start and end of the link.

In a step 520, the control points of the link are read. As noted above, each link has a generating equation that includes control points that define the link. For the method 500, characterization of the link includes the link type, indices, generating equation, and the control points. With respect to the programmable graphics pipeline 321, steps 518 and 520 can be performed by the vertex puller 322.

In some situations such as window-space stroking, the control points are also transformed in step 530 as needed. Transforming control points accounts for any rotation, translation, scaling, or perspective transformation intended for the polar stroked representation of the path. With respect to the programmable graphics pipeline 321, step 530 can be performed by the vertex shader 323 and below step 540 can be performed by the tessellation control shader 324.

In step 540, polar stroking intermediates for the link are computed. The polar stroking intermediates can be computed from the control points employing arc tangents. The polar stroking intermediates include N, p, Ψ, δ, $\Delta_\Sigma$. N is the number of quadrilaterals that will need for the polar stroked representation of the link. p is an ordered sequence of parametric values t that defines the link. The first p is always zero and the last p of the sequence is always one. Each intermediate p between the first and the last p are where the inflection points of the link are located. An inflection point is where a link changes the direction of bending. The number of inflection points can vary depending on the type of link. A cubic Bézier curve, for example, can have up to two inflection points.

Ψ is the tangent angle corresponding to each element p of the ordered sequence. For the first p, Ψ indicates the angle in which the link is heading initially. For the last p, Ψ indicates the angle at which the link terminates. For each intermediate p, Ψ indicates the tangent angle of its corresponding inflection.

δ is the number of degrees to step by along the different intervals of the link between inflections, and $\Delta_\Sigma$ is the cumulative number of integer steps to take along each interval of the link. N, p, Ψ, δ, $\Delta_\Sigma$ are arbitrary notations that are used to denote characteristics of a link that are employable for polar stroking. One skilled in the art of differential geometry could compute these polar stroking intermediate values as described and evidenced by the representative examples in FIGS. 6 through 15. The hodograph curve of the generating equation for the link can be used to determine at least some of the polar stroking intermediate values.

Once the polar stroking intermediates are obtained, they are used to determine the quadrilaterals. Determining the quadrilaterals is an iterative process that starts in a step 550 and continues to a step 560 by selecting a rib. A rib is one side of a quadrilateral having a length that is equal to the stroke width of the path. A pair of sequential ribs can form a quadrilateral. For an initial rib of a rib pair, an index value can be set to zero. The position and normal for the rib are evaluated in a step 570 and the vertices for the rib are generated in a step 572. With respect to the programmable graphics pipeline 321, steps 550 and 560 can be performed by the tessellation generator 325, and steps 570 and 572 can be performed by the tessellation evaluation shader 326. Each of the ribs is independent and can be processed in parallel.

In a step 574, a determination is made if a pair of ribs has been evaluated. For the initial rib, the determination can be if more than one rib for the link has been selected. As illustrated in FIG. 5, the determination can be made by comparing the current index value of the selected rib to zero. If a pair of ribs has not been evaluated, the method 500 continues to step 580 where a determination is made if there are more ribs to process for the link. When there are no other ribs of the link to process, the method 500 continues to step 590 and ends. For the first pass through the iterative rib process, there will be another rib to process. When there is at least one more rib to process, the method 500 returns to step 560 and the next rib is selected. At this point, the index can be increased by one for the next rib. The position and normal for the next rib are evaluated in step 570 and the vertices for the next rib are generated in step 572. A determination is then made if a pair of ribs has been evaluated in step 574. If not, the method 500 continues to step 580. If so, a quadrilateral for rasterization is generated in step 576. The quadrilateral is defined by the vertices of the pair of ribs. The quadrilateral can be provided to a rasterizer, such as the primitive assembly and rasterizer 327 or 427 of FIGS. 3-4. Alternatively, the quadrilateral could be split and represented as two triangles sharing a common edge. From step 576, the method 500 continues to step 580 and proceeds. The index for the ribs can be reset to zero in, for example, steps 576 or 580, for further indication of rib pairs in the iterative process. Other counters or comparison values can also be used to determine rib pairs. For example, a mesh shader approach as in FIG. 4 may generate rib pairs to match the thread parallelism of mesh shader instances.

The steps of generating vertices for ribs and then generating the quadrilaterals are repeated for each rib of the link. When there are no more ribs of the link as determined in step 580, the method 580 continues to step 516 where a determination is made if there is another link of the path to process. If there are no more links of the path, then the method 500 continues to step 590 and ends. All the generated quadrilaterals for the links of the path can then be used to, for example, render the path as a stroked tessellation. If there are more links to process, the method 500 continues to step 518 for the next link. As noted above, different stages of the programmable graphics pipeline 321 can be configured to perform designated steps of the method 500. With respect to the programmable graphics pipeline 421, the task shader 424 can be configured to performed steps 518 to 550, and the mesh shader 426 can be configured to perform steps 560, 570, 572, 574, and 576.

While presented as an iterative process, all the rib iterations can operate independently so at least portions of the method 500 can be performed in parallel, such as on a GPU. Multiple processing sets of ribs can be evaluated in parallel and multiple processing sets of links can be processed in parallel employing a GPU or GPUs that have parallel processors. In one example, a sequence of 32 ribs is evaluated in parallel; furthermore, several such sequences up to 32 ribs can be simultaneously evaluated in parallel. In some examples, ribs from eight links are processed simultaneously.

The method 500 can be used to generate various types of links including caps and joins. Caps in vector graphics systems can be round, square, triangular, or omitted. In polar stroking, a cap is handled as a degenerate link where the control points are all co-located at the cap's anchor point. The polar stroking intermediates N, p, $\Psi$, $\delta$, $\Delta_\Sigma$ can be computed such that the geometry of the cap can be generated with the same rib iteration procedure applied to curved segments. Caps are complicated by distinguishing "inside" and "outside" radii with the inside radius typically forced to zero for a cap. Square caps are further complicated by scaling the outside radius of the ribs at the corners of a square cap by the square root of two (1.414 . . . ). Augmenting the rib processing for these complications due to caps is straightforward and imposes minimal overhead on rib processing for non-cap links.

Similarly, joins in vector graphics systems can be round, beveled, mitered, triangular, or omitted. In polar stroking, a join is handled as a degenerate link where the control points are all co-located at the join's junction point. The polar stroking intermediates N, p, $\Psi$, $\delta$, $\Delta_\Sigma$ can be computed such that the geometry of the cap can be generated with the same rib iteration procedure applied to curved segments. As with caps, joins are complicated by distinguishing "inside" and "outside" radii with the inside radius typically forced to zero for a join. Mitered joins are further complicated by computing the miter point of such joins and either truncating the miter or reverting to a bevel join if the miter point would exceed the path's specified miter limit depending on the miter join style. Augmenting the rib processing for these complications due to joins is straightforward and imposes minimal overhead on rib processing for non-join links.

The path 100 and a link from the path 100, the quadratic Bézier segment, will now be used as example for describing the method 500. FIG. 6 illustrates the quadratic Bézier segment 118 along with a hodograph 610 that includes a hodograph curve 612 for the quadratic Bézier segment 118, and a polar stroked representation 620 of the quadratic Bézier segment 118 provided by the method 500. The hodograph 610 includes 360 degrees of polar angles that are divided by 18 dashed polar lines at 10 degree increments, wherein each of the dashed lines passes through the origin of the hodograph. FIG. 6 also includes the polar stroking intermediates and their values, denoted as 630, for the quadratic Bézier segment 118. The intermediates in FIG. 6 (and FIGS. 11 through 15 as well) are computed so the maximum absolute gradient angle change from rib to rib will be no more than 5 degrees. This threshold of 5 degrees is an arbitrary setting. A smaller (larger) value would result in more (less) tessellation and generate more (fewer) quadrilaterals in the resulting polar stroking tessellation. Advantageously, tuning this threshold provides an intuitive control over the resulting tessellation quality of the polar stroking. More quadrilaterals will result in a better approximation to the true stroked region of a link while fewer quadrilaterals could render faster or with improved power efficiency.

Shown with the quadratic Bézier segment 118 are the control points for the generating equation that defines the quadratic Bézier segment 118. The quadratic Bézier segment 118 includes three control points denoted as first, second, and third control points 101, 102, 103, respectively. The control points 101, 102, 103, are used to generate the polar stroking intermediates 630 that are needed to provide the polar stroked representation 620. The control points can be obtained from typical SVG commands that are used to generate the quadratic Bézier segment 118.

The polar stroking operation according to method 500 to generate the polar stroked representation 620 employs stepping in tangent angles along the quadratic Bézier segment 118. Stepping in tangent angles along the quadratic Bézier segment 118 involves determining when the quadratic Bézier segment 118 might change from turning clockwise to counter-clockwise (or vice versa) and then at every step, solving for when a gradient of the quadratic Bézier segment 118 is orthogonal to a 90 degree rotation of each tangent angle step. This approach involves solving a line-curve intersection at every step along the quadratic Bézier segment 118.

FIGS. 7-10 illustrate the steps of the method 500 with respect to the quadratic Bézier segment 118 that provide the polar stroked representation 620. FIGS. 7-10 elucidate polar stroking by means of the polar stroked representation 620. For FIGS. 6-10, the polar stroked representation 620 is a stroked tessellation of the quadratic Bézier segment 118, such as rendered by the renderer 300 or 400.

Figure 7:
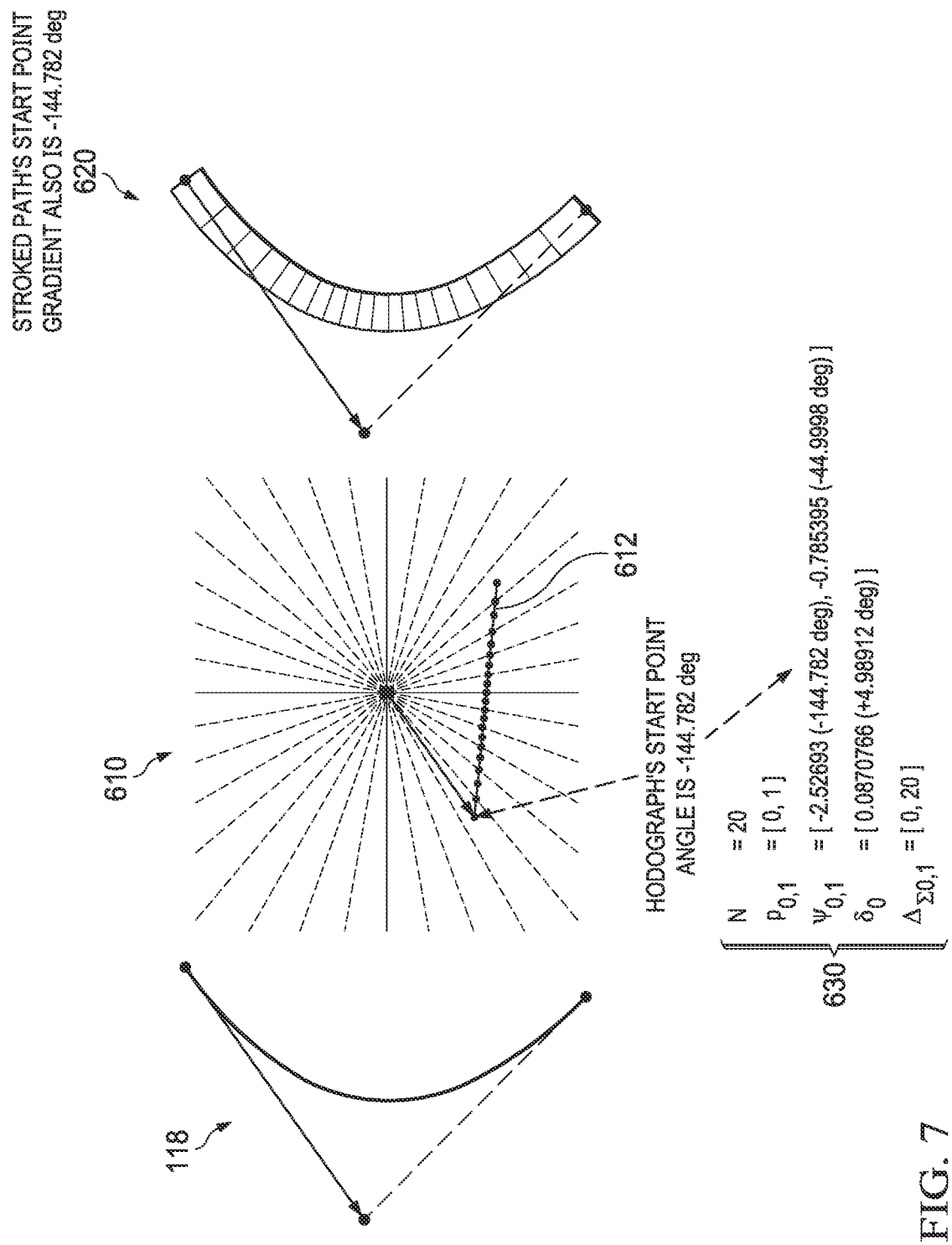

FIG. 7 illustrates generating the hodograph curve 612, which is the gradient graph of the quadratic Bézier segment 118. The hodograph curve 612 represents the speed and direction that is changing when moving along the quadratic Bézier segment 118. At the beginning, at first control point 101 where p is 0, the quadratic Bézier segment 118 is heading in a negative direction of 144.782 degrees (or −2.52693 radians). This is indicated by the polar stroking intermediate $\Psi_0$ that indicates the angle in which the quadratic Bézier segment 118 is heading initially. The initial angle can be determined from the control points 101, 102, and indicates the start point angle for the hodograph curve 612 as shown in FIG. 7. As also shown in FIG. 7, the start point for the polar stroked representation 620 is also the −144.782 degrees of $\Psi_0$.

Figure 8:
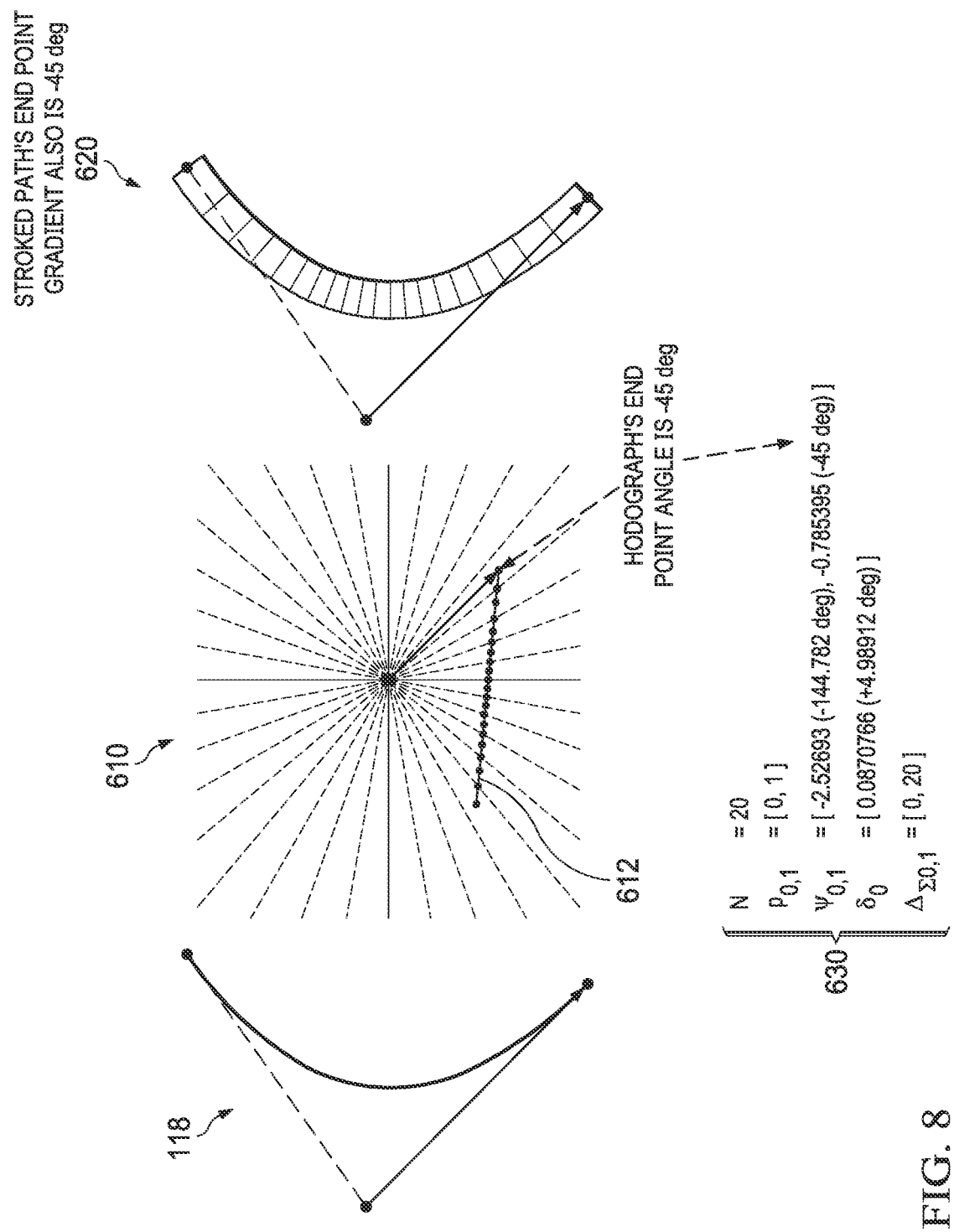

FIG. 8 illustrates that moving along the quadratic Bézier segment 118, the direction ultimately ends at −45 degrees (or −0.785395 radians), which is the angle endpoint for the hodograph curve 612. −45 degrees is the $\Psi_1$ which indicates the angle at which the quadratic Bézier segment 118 terminates. The terminating angle can be determined from the control points 102, 103, and indicates the end point angle for the hodograph curve 612 as shown in FIG. 8. As also shown in FIG. 8, the end point gradient for the polar stroked representation 620 is also the −45 degrees of $\Psi_1$.

Figure 9:
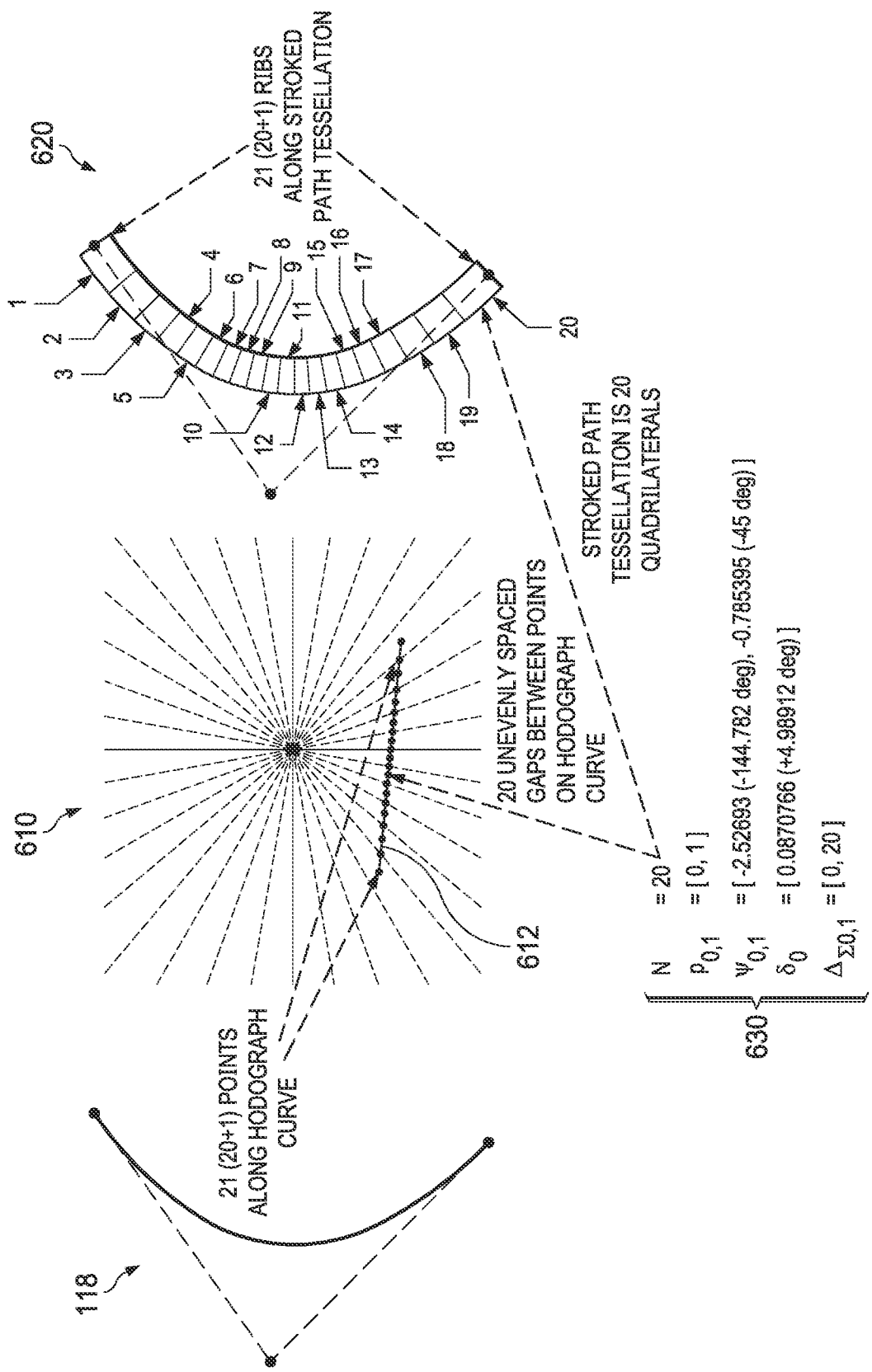

FIG. 9 illustrates determining the number of quadrilaterals N that will needed for the polar stroked representation of the link and also represents the number of spaced gaps between points on the hodograph curve 612. As indicated in FIG. 9, the gaps can be unevenly spaced along the hodograph curve 612 (a line segment); however careful inspection of the polar angle of each point along hodograph curve 612 would confirm the change in polar angle is uniform. In this example N is 20. The 20 quadrilaterals that make up the stroked tessellation of quadratic Bézier segment 118, and the 21 ribs that define the 20 quadrilaterals, are also illustrated on the polar stroked representation 620 in FIG. 9. $\Delta_{\Sigma\ 0,1}$ indicates a cumulative number of 20 steps to take along each interval of the quadratic Bézier segment 118.

Figure 10:
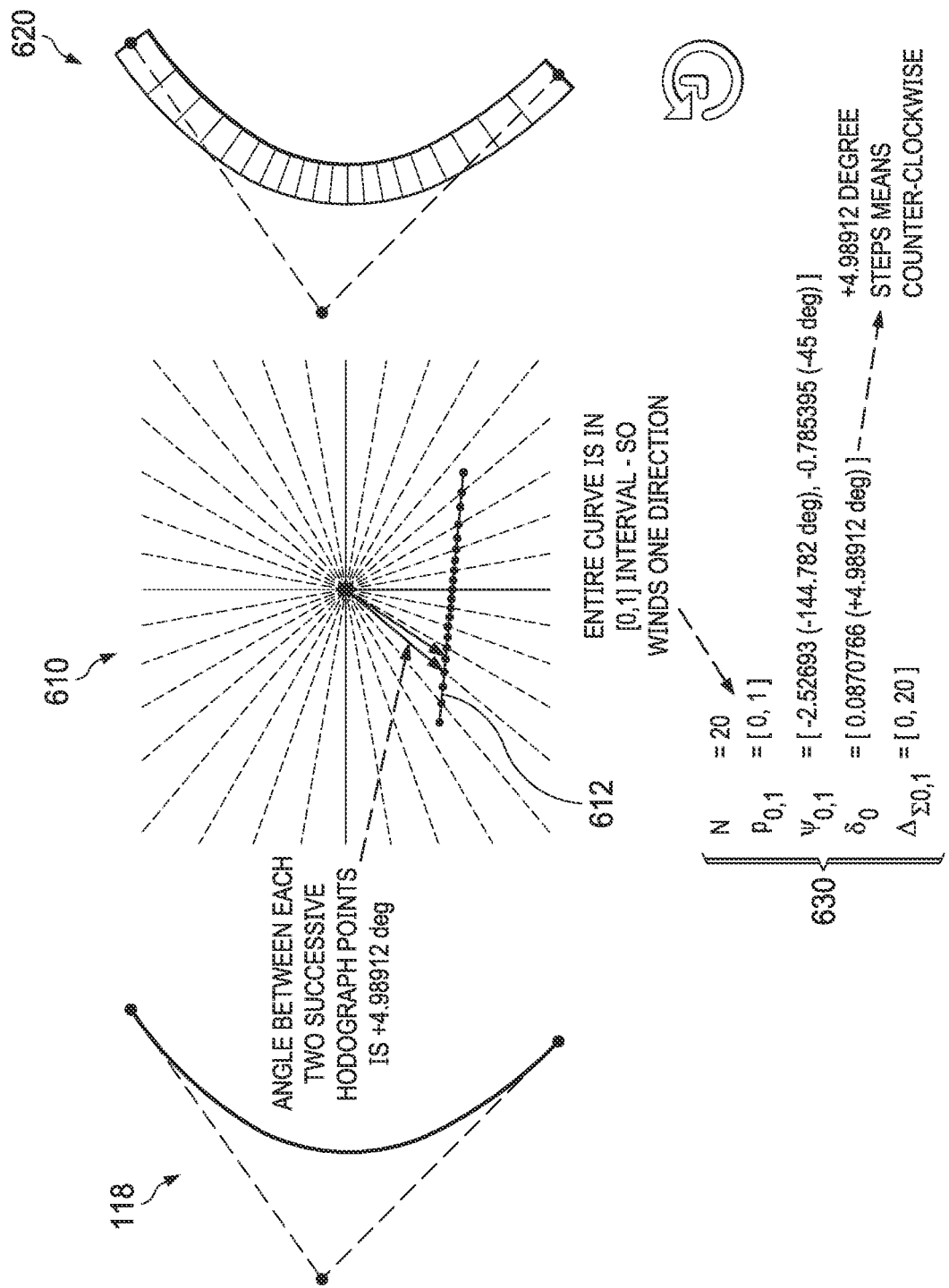

FIG. 10 illustrates the correspondence between the polar stroking intermediate δ with respect to the hodograph curve 612. In this example, δ is +4.98912 degrees (or 0.0870766 radians) which indicates the uniform angle between each two successive points on the hodograph curve 612. The positive sign indicates the steps are in a counter-clockwise direction. As indicated by the polar stroking intermediate p, the entire quadratic Bézier segment 118 is in [0,1] interval, which indicates the quadratic Bézier segment 118 is winding in one direction.

FIGS. 11 to 15 represent other links of the path 100, the hodograph with hodograph curves, and the polar stroked representation. For FIGS. 11 to 15 as with FIGS. 6 to 10, the polar stroked representation is an example of a rendered stroked tessellation. The method 500 can be used to similarly generate the polar stroked representations of FIGS. 11 to 15 as demonstrated by FIGS. 7 to 10 for the quadratic Bézier segment 118.

Figure 11:
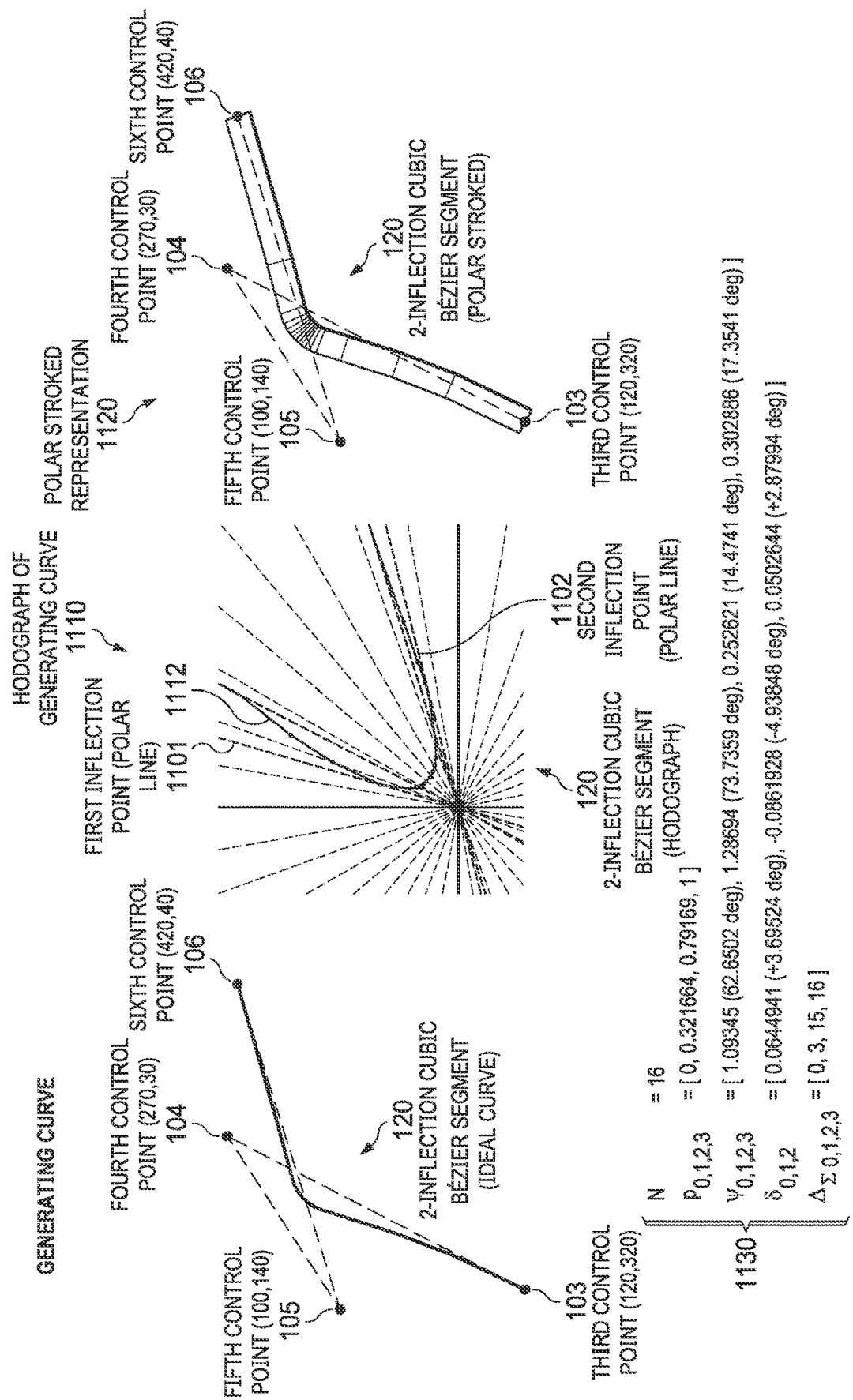

FIG. 11 demonstrates a cubic Bézier segment with two inflections 120, the hodograph 1110 with the hodograph curve 1112 of the cubic Bézier segment with two inflections 120, and the polar stroked representation 1120. Also illustrated are the polar stroking intermediates and their values 1130 for the cubic Bézier segment with two inflections 120. The control points 103, 104, 105, and 106 for the cubic Bézier segment with two inflections 120 are numbered to correspond to the adjacent links and the sequence of links that make up the path 100. As such, the third control point 103 is the third control point of the quadratic Bézier segment 118 and the sixth control point 106 is the sixth control point denoted in FIG. 12 for the cubic Bézier segment with zero inflections 130. The consecutive control points continue through FIGS. 11 to 15 for each of the links of the path 100.

Observe in FIG. 11 how the sequence p has four elements, [0, 0.321664, 0.79169, 1]. The intermediate values 0.321664 and 0.79169 in p identify the parametric values of inflection points along the cubic Bézier segment with two inflections 120. Likewise, the sequence $\Psi$ has four elements indicating the polar angles of the inflection points. So the hodograph curve 120 starts at $\Psi_0$ (62.6502 degrees), rotates counter-clockwise to $\Psi_1$ (73.7359 degrees) for the first inflection point 1101, then reverses direction to rotate clockwise to $\Psi_2$ (14.4741 degrees) for the second inflection point 1102, and reverses direction again to rotate counter-clockwise to $\Psi_3$ (17.3541 degrees). Furthermore, the sequences δ indicates how many relative degrees to step within an interval. For example, the clockwise middle interval between the first 1101 and second 1102 inflection point steps by −4.93848 degrees. Lastly the sequence $\Delta_\Sigma$ indicates how the 17 ribs are distributed over the 2-inflection cubic Bézier segment 120. For example, the middle interval starts at rib 3 ($\Delta_{\Sigma 1}$) for the first inflection point 1101 and ends at rib 15 ($\Delta_{\Sigma 2}$) for second inflection point 1102. As N is 16, there are 17 ribs and 16 quadrilaterals total in polar stroked representation 1120.

Figure 12:
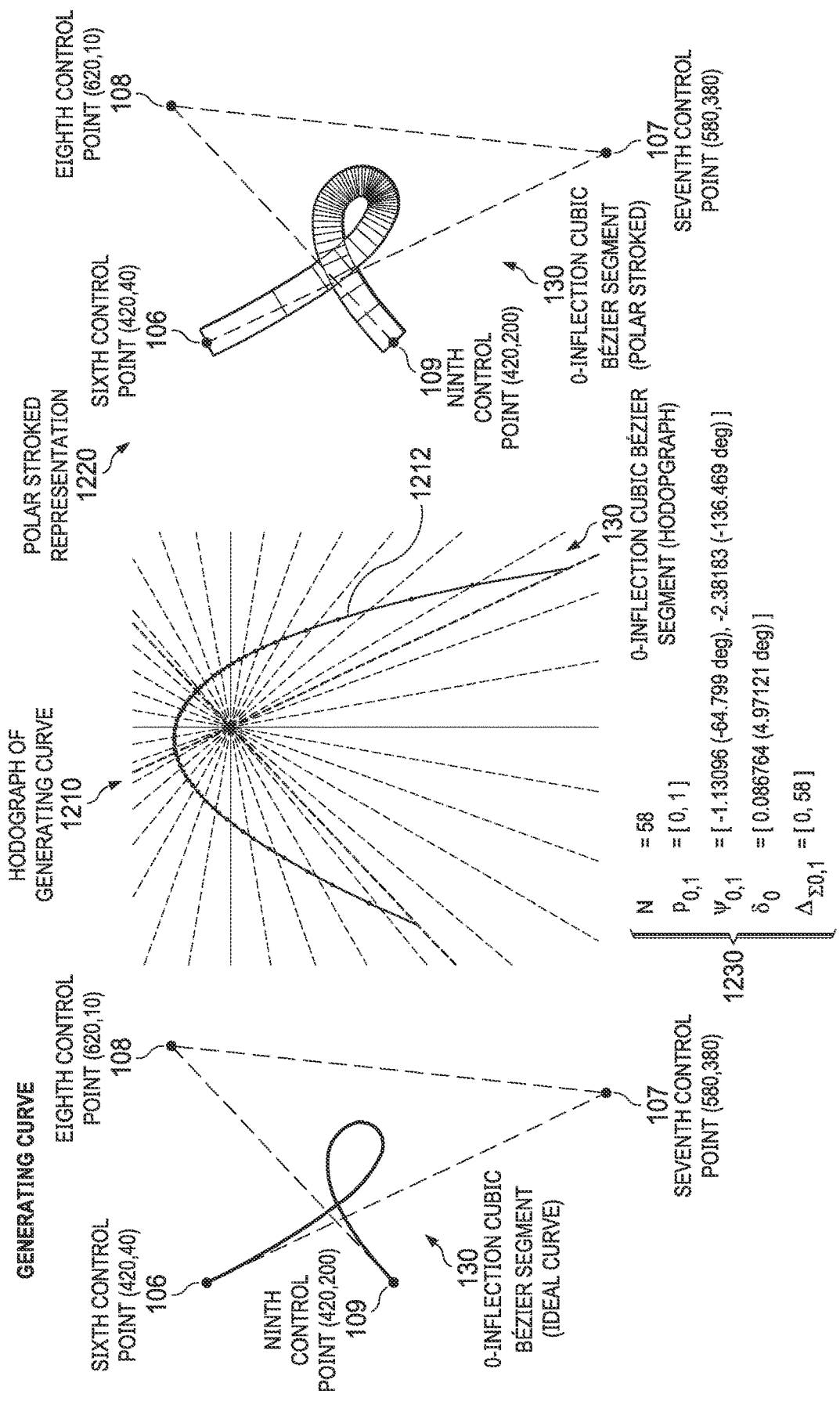

FIG. 12 includes the cubic Bézier segment with zero inflections 130, the hodograph 1210 with the hodograph curve 1212 of the cubic Bézier segment with zero inflections 130, and the polar stroked representation 1220. Control points 106, 107, 108, and 109 are shown for both the generating curve of the cubic Bézier segment with zero inflections 130 and the polar stroked representation 1220. Also illustrated are the polar stroking intermediates and values 1230 for the cubic Bézier segment with zero inflections 130. As the cubic Bézier segment with zero inflections 130 has no inflections, the parametric sequence p is simply [0, 1] like FIG. 6, and there is no change in rotation when generating the 59 ribs and 58 quadrilaterals in polar stroked representation 1220.

Figure 13:
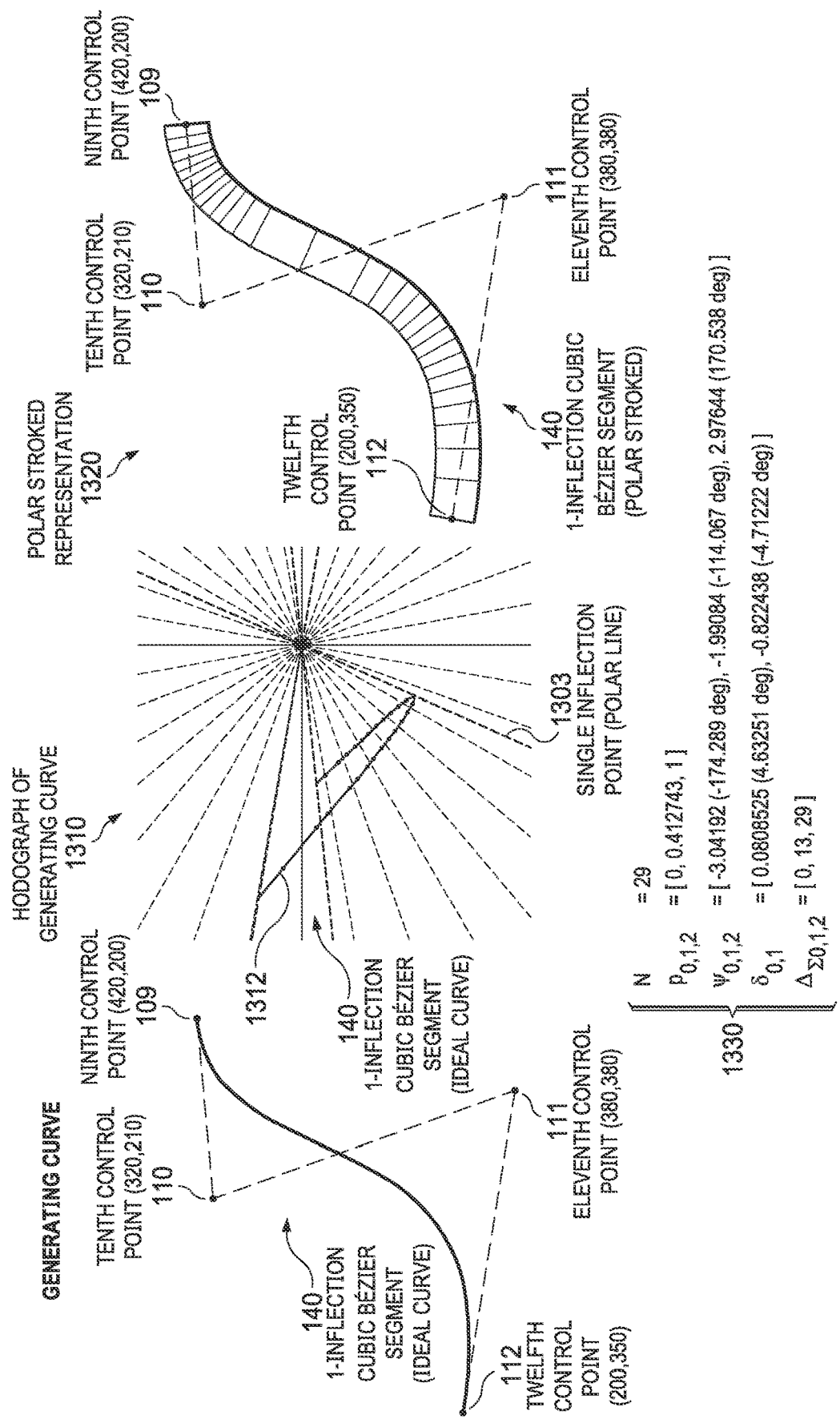

FIG. 13 includes the cubic Bézier segment with one inflection 140, the hodograph 1310 with the hodograph curve 1312 of the cubic Bézier segment with one inflection 140, the polar stroked representation 1320, and the polar stroking intermediates and values 1330 for the cubic Bézier segment with one inflection 140. Control points 109, 110, 111, and 112 are shown for both the generating curve of the cubic Bézier segment with one inflection 140 and the polar stroked representation 1320. The presence of a single inflection explains why the sequence p has three elements, [0, 0.412743, 1]. The first parametric intervals from [0, 0.412743] arrives at the single inflection point 603 and the second parametric interval from [0.412743, 1]. The first interval steps in uniform counter-clockwise steps until reaching the single inflection point 1303 and then steps in uniform clockwise steps. Polar stroked representation 1320 shows how polar stroking advantageously takes uniform steps in gradient angle magnitude so that the mostly flat region in the middle of polar stroked representation 1320 has fewer quadrilaterals than the more curved ends of the tessellated result.

Figure 14:
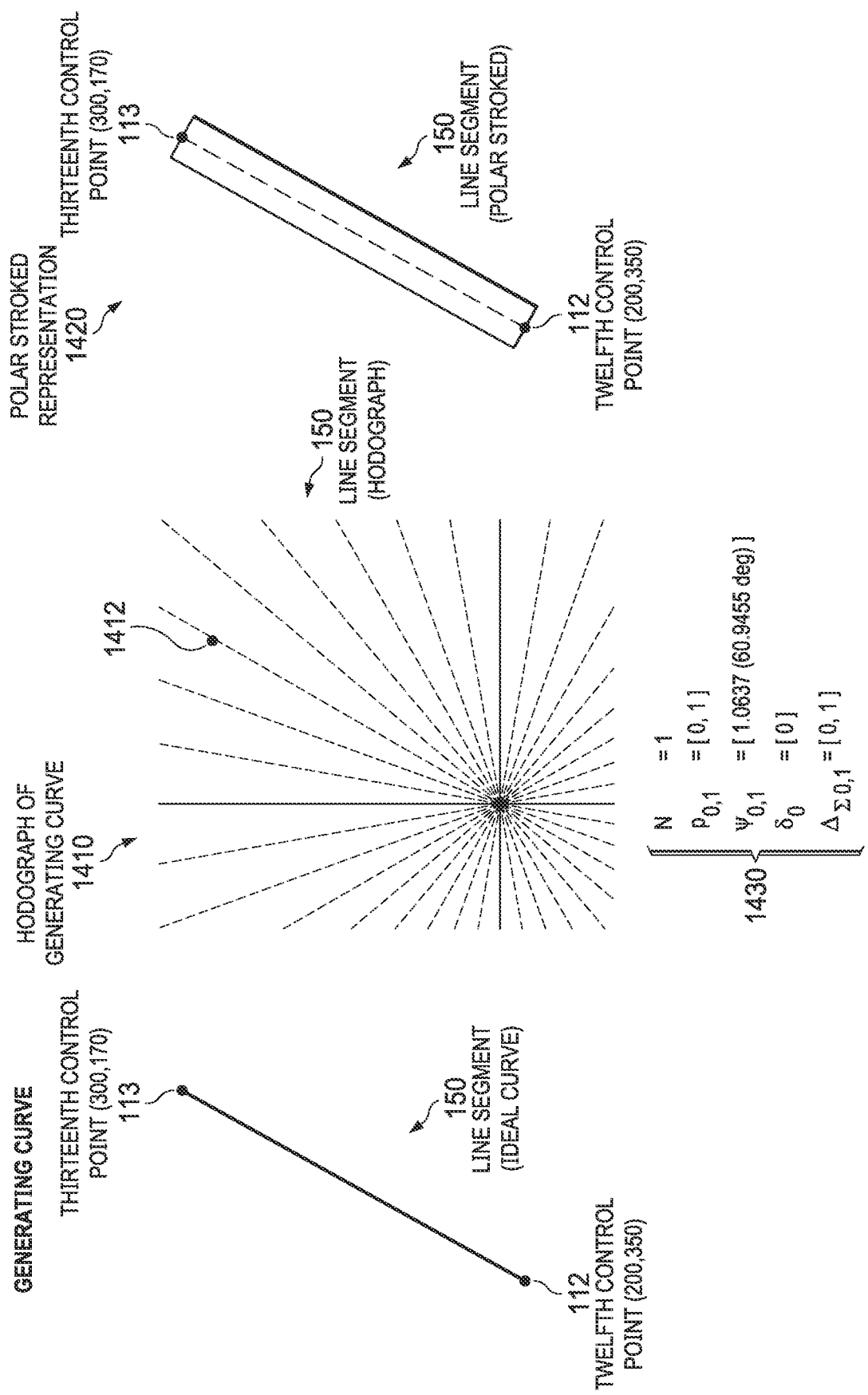

FIG. 14 includes the line segment 150, the hodograph 1410 with the hodograph curve 1412 of the line segment 150, the polar stroked representation 1420, and the polar stroking intermediates and values 1430 for the line segment 150. Control points 112 and 113 are shown for both the generating curve of the line segment 150 and the polar stroked representation 1420. Observe how the polar stroked representation 1420 is advantageously a single quadrilateral (N=1) as there is no gradient angle change ($\delta_0=0$) along line segment 150.

Figure 15:
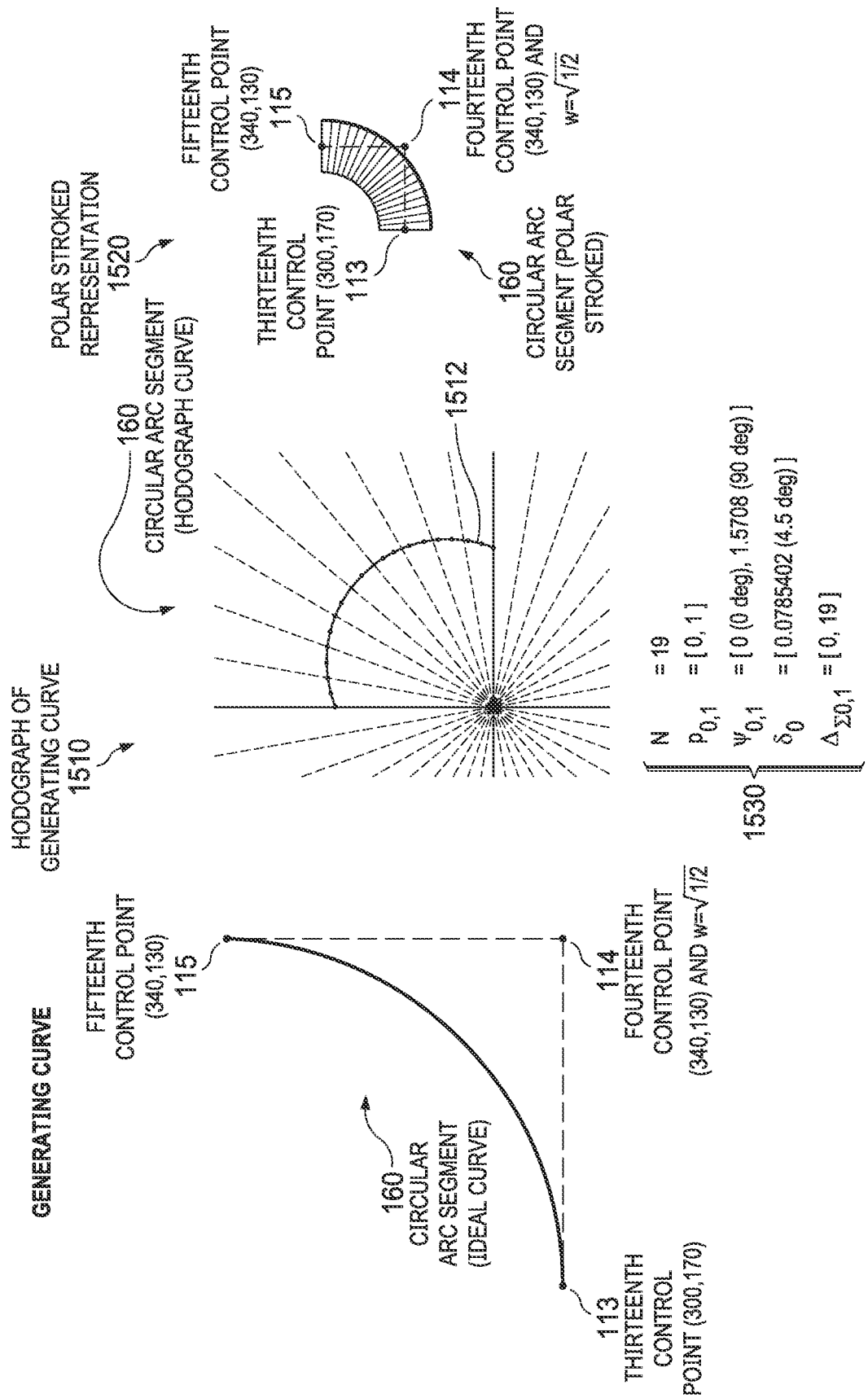

FIG. 15 includes the circular arc 160, the hodograph 1510 with the hodograph curve 1512 of the circular arc 160, the polar stroked representation 1520, and the polar stroking intermediates and values 1530 for the circular arc 160. The control points 113, 114, and 115 are shown for both the generating curve of the circular arc 160 and the polar stroked representation 1520. As the circular arc 160 has no inflections, the parametric sequence p is [0, 1] like in FIGS. 6 and 12, and there is no change in rotation when generating the 20 ribs and 19 quadrilaterals in polar stroked representation 1520.

FIG. 16 illustrates a flow diagram of an example of a method 1600 of rendering stroked paths carried out according to the principles of the disclosure. The path has at least one link and can have multiple links and different types of links. The method 1600 describes processing a single link of the path and is performed for each link of the path. Advantageously, processing of each link can be performed in parallel when employing parallel processors. The method 1600, or at least a part of the method 1600, can be carried out by the polar stroking system 200, the renderer 300, or the renderer 400 as disclosed herein. The method 1600 begins in a step 1605.

In a step 1610, a characterization of a link of the path is obtained. A GPU can determine the characterization based on information received about the link, such as from a CPU that performs preprocessing on the path. In other examples, the GPU can receive the characterization, such as from the CPU. The link characterization can include the link type, the indices, the generating equation for the link, and the control points for the link.

Polar stroking intermediate values of the link are computed in a step 1620 from the characterization. The polar stroking intermediates can be computed from the control points employing arc tangents as disclosed herein. As discussed above, the polar stroking intermediates can include N, p, Ψ, δ, $\Delta_\Sigma$.

A sequence of quadrilaterals is generated in a step 1630 to represent the link. The sequence of quadrilaterals can be generated employing the polar stroking intermediates. In a step 1640, a stroked tessellation of the link is provided employing the sequence of quadrilaterals. FIGS. 6 through 15 and the corresponding above discussions provide examples of generating quadrilaterals for different types of links and providing a stroked tessellation of the link from the sequence of quadrilaterals. The method 1600 continues to step 1650 and ends. As noted above, the method 1600 is performed for each link of the path and the processing for each of the links can be performed in parallel.

FIG. 17 illustrates a block diagram of an example of a computing device 1700 configured to display a path employing polar stroking according to the principles of the disclosure. Path 100 is used as an example. The computing device 1700 can be, for example, a laptop, a desktop, a computing pad, a television (including a set-top box), or a smart phone. The computing device 1700 includes a polar stroking system 1710 and a screen 1720. The computing device 1700 can also include additional components typically included in a computing device configured to display images on a screen thereof. The polar stroking system 1710 can be configured to operate as the polar stroking system 200, the renderer 300, the renderer 400, or according a polar stroking method as disclosed herein. The polar stroking system 1710 generates polar stroked representations of the path 100 and provides the polar stroked representations to the screen 1720 to display the path 100. The screen 1720 can be a conventional screen of a computing device that is used to display images.

FIG. 18 illustrates a block diagram of an example of a printer 1800 configured to print a path employing polar stroking according to the principles of the disclosure. Path 100 is used as an example path. The printer 1800 includes a polar stroking system 1810, a controller 1820, and a printing mechanism 1830. The printer 1800 can also include additional components typically included in a printer configured to print images. The polar stroking system 1810 can be configured to operate as the polar stroking system 200, the renderer 300, the renderer 400, or according to a polar stroking method disclosed herein. The polar stroking system 1810 generates polar stroked representations of the path 100 and provides the polar stroked representations to the controller 1820. The controller 1820 employs the polar stroked representations to generate print commands to direct the printing mechanism 1830 to print the path 100 based on the polar stroked representations. The printing mechanism 1830 can be a conventional component of a printer, such as a pen, that is used to print images. The printed path 100 is shown on a piece of paper 1840.

Various aspects of the disclosure can be claimed including the systems and methods as noted in the summary. Each of the aspects noted in the summary may have one or more of the elements of the dependent claims presented below in combination.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks.

Those skilled in the art to which this application relates will appreciate that other and further additions, deletions, substitutions and modifications may be made to the described embodiments.

What is claimed is:

1. A method of approximating a link of a path, comprising:
   determining tangent angle changes of a link of a path;
   evaluating the link in steps based on the tangent angle changes;
   providing a polar stroked representation of the link employing the steps, wherein the evaluating is performed non-recursively, and
   rendering the link based on the polar stroked representation.

2. The method as recited in claim 1, wherein the determining the tangent angle changes includes intersecting a hodograph curve of a generating function of the link with polar lines.

3. The method as recited in claim 2, wherein at least some of the intersecting is performed in steps of uniform angle changes.

4. The method as recited in claim 1, wherein the rendering includes generating a stroked tessellation of the link employing the polar stroked representation.

5. The method as recited in claim 4, wherein the polar stroked representation is a sequence of polygons.

6. The method of claim 1, wherein the evaluating accounts for changes in curvature sign.

7. The method of claim 1, wherein the link is a rational quadratic Bezier curve.

8. The method of claim 1, wherein the link is a cubic Bezier curve.

9. The method of claim 1, wherein the link is a join.

10. The method of claim 1, wherein the evaluating is performed by shader execution on a GPU.

11. The method of claim 10, wherein the evaluating is performed by programmable GPU tessellation shader stages.

12. The method of claim 10, wherein the evaluating is performed by mesh shaders.

13. The system as recited in claim 1, wherein the link is a cap, a join, or a segment of the path.

14. A method of operating a machine using an approximation of a link of a path, comprising:
    determining tangent angle changes of a link of a path;
    evaluating the link in steps based on the tangent angle changes;
    providing a polar stroked representation of the link employing the steps, wherein the evaluating is performed non-recursively, and
    controlling an operation of a machine based on the polar stroked representation.

15. The method as recited in claim 14, wherein the link is a segment, and the machine is a Computer Numerical Control (CNC) machine.

16. A polar stroking system, comprising:
    a path processor configured to decompose a path into links; and
    a polar stroking processor configured to determine polar stroking intermediates of the links from a characterization of the links, generate, employing the polar stroking intermediates, a polar stroked representation for each of the links, and provide a visual representation of the path employing the polar stroked representation for each of the links.

17. The system as recited in claim 16, wherein the characterization includes type, indices, and control points of the link.

18. The system as recited in claim 17, wherein the polar stoking processor is configured to determine at least some of the polar stroking intermediates from the control points.

19. The system as recited in claim 18, wherein the polar stroking processor is configured to transform the control points before determining the polar stroking intermediates from the control points.

20. The system as recited in claim 16, wherein the polar stroking processor is one or more graphics processing unit (GPU).

21. The system as recited in claim 20, wherein the determining the polar stroking intermediates is performed by a polar stroking shader implemented on the one or more GPU.

22. The system as recited in claim 16, wherein the system is a vector graphics rendering system and the polar stroked representations are employed to render a stroked tessellation as the visual presentation of the path.

23. The system as recited in claim 16, wherein the link is a cap, a join, or a path segment.

24. The system as recited in claim 16, wherein the polar stroked representation for each of the links is a sequence of polygons.

25. The system as recited in claim 24, wherein the polygons are quadrilaterals.

26. A computing device comprising the system as recited in claim 16 and a screen configured to display the visual presentation of the path.

27. A computing device as recited in claim 26, wherein the computing device is a smart phone.

28. A printer comprising the system as recited in claim 16 and a printing mechanism configured to print the visual presentation of the path.

29. A renderer, comprising:
    a central processing unit (CPU) configured to decompose a path into links; and
    a graphics processing unit (GPU) configured to render a stroked tessellation of the path based on a polar stroked representation of each of the links, wherein the polar stroked representation of each of the links is generated by a non-recursive polar stroked method.

30. The renderer as recited in claim 29, wherein the GPU is further configured to determine polar stroking intermediate values for each of the links and generate the polar stroked representation of each of the links employing corresponding ones of the polar stroking intermediate values.

31. The renderer as recited in 29, wherein the GPU includes a programmable graphics pipeline with programmable shader stages and fixed-function stages configured to generate the polar stroked representations, wherein the programmable shader stages include at least one polar stroking shader.

32. The renderer as recited in claim 29, wherein the polar stroked representation of each of the links is a sequence of quadrilaterals.

33. A method of rendering stroked paths, comprising:
    obtaining a characterization of at least one link of a path;
    computing polar stroking intermediate values of the at least one link from the characterization;
    generating, employing the polar stroking intermediates, a sequence of quadrilaterals to represent the at least one link; and
    rendering a stroked tessellation of the path employing the sequence of quadrilaterals for the at least one link.

* * * * *